United States Patent
Bourlas et al.

(10) Patent No.: US 10,142,988 B2
(45) Date of Patent: Nov. 27, 2018

(54) BASE STATION CONFIGURED FOR PERSISTENT RESOURCE ALLOCATION

(71) Applicant: Wi-LAN, Inc., Ottawa (CA)

(72) Inventors: Yair Bourlas, San Diego, CA (US); Kirupairaj Asirvatham, San Diego, CA (US)

(73) Assignee: WI-LAN INC., Ottawa (CA)

( * ) Notice: Subject to any disclaimer, the term of this patent is extended or adjusted under 35 U.S.C. 154(b) by 48 days.

(21) Appl. No.: 14/879,632

(22) Filed: Oct. 9, 2015

(65) Prior Publication Data

US 2016/0037529 A1 Feb. 4, 2016

Related U.S. Application Data

(63) Continuation of application No. 14/271,596, filed on May 7, 2014, now Pat. No. 9,161,341, which is a
(Continued)

(51) Int. Cl.
*H04W 72/04* (2009.01)
*H04L 1/18* (2006.01)
(Continued)

(52) U.S. Cl.
CPC ....... *H04W 72/0453* (2013.01); *H04L 1/1861* (2013.01); *H04L 1/1887* (2013.01);
(Continued)

(58) Field of Classification Search
CPC ... H04L 1/1887; H04L 1/0072; H04L 1/1825; H04L 1/1829; H04L 1/00; H04L 1/1896;
(Continued)

(56) References Cited

U.S. PATENT DOCUMENTS 6,987,780 B2 * 1/2006 Wei ............... H04L 1/1812
370/342
7,149,200 B1 12/2006 Vadgama
(Continued)

FOREIGN PATENT DOCUMENTS

EP 1 746 855 1/2007
EP 1 753 256 2/2007
(Continued)

OTHER PUBLICATIONS

Ben-Shimol et al., "Efficient Mapping of Voice Calls in Wireless OFDMA Systems," IEEE Communications Letters, vol. 10, No. 9 (Sep. 2006).
(Continued)

*Primary Examiner* — Nadeem Iqbal
(74) *Attorney, Agent, or Firm* — Volpe and Koenig, P.C.

(57) ABSTRACT

Methods and apparatus for communicating and utilizing persistent allocation of resources are described herein. A base station may allocate persistent resources to a client station, and may associate the client station or persistent resource allocation with a particular shared NACK channel. The base station may monitor the NACK channel for a NACK indicating a map error. The base station may monitor the resource allocation to implicitly determine a map error. The base station may resend one or more persistent resource allocation information elements in response to the NACK or implicit error determination. A client station having a persistent resource allocation may monitor persistent resource allocation information elements in map messages and/or may indicate failure to receive a persistent resource allocation information element in a NACK message on a shared NACK channel.

24 Claims, 10 Drawing Sheets

Related U.S. Application Data continuation of application No. 13/861,013, filed on Apr. 11, 2013, now Pat. No. 8,732,541, which is a continuation of application No. 12/204,719, filed on Sep. 4, 2008, now Pat. No. 8,423,853.

(60) Provisional application No. 61/013,622, filed on Dec. 13, 2007, provisional application No. 60/971,526, filed on Sep. 11, 2007.

(51) Int. Cl.
    *H04L 5/00*     (2006.01)
    *H04L 1/00*     (2006.01)
    *H04W 88/08*     (2009.01)

(52) U.S. Cl.
    CPC .......... *H04L 5/0053* (2013.01); *H04L 5/0055* (2013.01); *H04L 5/0096* (2013.01); *H04W 72/04* (2013.01); *H04W 72/0466* (2013.01); *H04L 1/001* (2013.01); *H04L 1/0004* (2013.01); *H04L 5/003* (2013.01); *H04L 5/0007* (2013.01); *H04W 88/08* (2013.01)

(58) Field of Classification Search
    CPC ........... H04W 72/042; H04W 72/0406; H04W 72/0453; H04W 72/1268; H04W 72/1284
    See application file for complete search history.

(56) References Cited

U.S. PATENT DOCUMENTS

| | | | |
|---|---|---|---|
| 7,359,345 | B2 | 4/2008 | Chang |
| 7,472,027 | B1 | 12/2008 | Batcher et al. |
| 7,609,639 | B2 | 10/2009 | Vukovic et al. |
| 8,006,158 | B2 | 8/2011 | Kim et al. |
| 8,059,681 | B2 * | 11/2011 | Kim ............. H04W 28/065 370/469 |
| 8,423,853 | B2 | 4/2013 | Bourlas et al. |
| 8,732,541 | B2 | 5/2014 | Bourlas et al. |
| 9,099,410 | B2 | 8/2015 | McCain |
| 9,295,003 | B2 * | 3/2016 | Oteri ............. H04W 52/241 |
| 2001/0010687 | A1 | 8/2001 | Lee |
| 2003/0095538 | A1 | 5/2003 | Kayama et al. |
| 2003/0227875 | A1 | 12/2003 | Wei et al. |
| 2005/0107036 | A1 | 5/2005 | Song et al. |
| 2005/0286408 | A1 | 12/2005 | Jin et al. |
| 2006/0007849 | A1 | 1/2006 | Kim et al. |
| 2006/0038677 | A1 | 2/2006 | Diener et al. |
| 2006/0293076 | A1 | 12/2006 | Julian et al. |
| 2007/0086422 | A1 | 4/2007 | Kim et al. |
| 2007/0184842 | A1 | 8/2007 | Pederson et al. |
| 2007/0263568 | A1 * | 11/2007 | Kim ............. H04W 28/065 370/331 |
| 2007/0274342 | A1 | 11/2007 | Kim et al. |
| 2007/0280166 | A1 * | 12/2007 | Jung ............. H04B 1/713 370/331 |
| 2007/0298822 | A1 | 12/2007 | Wan et al. |
| 2007/0300120 | A1 | 12/2007 | Kim et al. |
| 2008/0019327 | A1 | 1/2008 | Kwon et al. |
| 2008/0020778 | A1 | 1/2008 | Pi |
| 2008/0062944 | A1 | 3/2008 | Smith et al. |
| 2008/0117891 | A1 | 5/2008 | Damnjanovic et al. |
| 2008/0130590 | A1 | 6/2008 | Kim et al. |
| 2008/0144547 | A1 | 6/2008 | Kwon et al. |
| 2008/0233992 | A1 * | 9/2008 | Oteri ............. H04W 52/241 455/522 |
| 2008/0268850 | A1 | 10/2008 | Narashima et al. |
| 2008/0310333 | A1 * | 12/2008 | Balachandran ....... H04L 1/1812 370/310 |
| 2008/0311919 | A1 | 12/2008 | Whinnett et al. |
| 2009/0022098 | A1 * | 1/2009 | Novak ............. H04L 1/14 370/329 |
| 2009/0075677 | A1 | 3/2009 | Seger et al. |
| 2009/0137254 | A1 * | 5/2009 | Vukovic ............. H04W 72/12 455/452.1 |
| 2009/0138598 | A1 | 5/2009 | Shrivastava et al. |
| 2010/0020758 | A1 | 1/2010 | Kim et al. |
| 2010/0246511 | A1 | 9/2010 | Kim et al. |

FOREIGN PATENT DOCUMENTS

| | | |
|---|---|---|
| EP | 1 819 107 | 8/2007 |
| WO | 06/083077 | 8/2006 |
| WO | 06/130741 | 12/2006 |
| WO | 06/130742 | 12/2006 |
| WO | 07/000696 | 1/2007 |
| WO | 07/018406 | 2/2007 |
| WO | 2007/095473 A1 | 8/2007 |

OTHER PUBLICATIONS

Bourlas et al., "Persistent Allocation Error Recovery Procedures," EEE 802.16 Broadband Wireless Access Working Group, IEEE C802.16maint-08/030r2 (Jan. 14, 2008).

Bourlas et al., "Persistent Allocation Error Recovery Procedures," EEE 802.16 Broadband Wireless Access Working Group, IEEE C802.16maint-08/054r2 (Jan. 16, 2008).

Bourlas et al., "Persistent Allocation Error Recovery Procedures," S802.16maint-08/030r2 (Jan. 14, 2008).

Bourlas et al., "Persistent Allocation Error Recovery," IEEE 802.16 Broadband Wireless Access Working Group, IEEE C802.16maint.-08/252r3 (Jul. 16, 2008).

Harris et al., "MAP NACK Channel for Persistent Allocation," IEEE 802.16 Presentation Submission Template (Rev. 9), IEEE C802.16maint-08/110 (Mar. 10, 2008).

Harris et al., "Resource Shifting in Persistent Scheduling," IEEE 802.16 Broadband Wireless Access Working Group, IEEE C802.16maint.-08/111r1 (Mar. 17, 2008).

Harris et al., "Resource Shifting in Persistent Scheduling," IEEE 802.16 Broadband Wireless Access Working Group, IEEE C802.16maint.-08/111r2 (Mar. 17, 2008).

Persson et al., "Voice over IP Realized for the 3GPP Long Term Evolution," IEEE Vehicular Technology Conference, pp. 1436-1440 (Sep. 2007).

Philips, "Text Proposal for TR 25.858 for ACK/NACK Signaling," TSG RAN WG1 #22, TSGR(01)1202 (Nov. 19-23, 2001).

Third Generation Partnership Project, "Technical Specification Group Radio Access Network; High Speed Downlink Packet Access; Physical Layer Aspects (Release 5)," 3GPP TR 25.858 V5.0.0 (Mar. 2002).

Third Generation Partnership Project, "Technical Specification Group Radio Access Network; High Speed Downlink Packet Access (HSDPA); Overall Description; Stage 2 (Release 7)," 3GPP TR 25.308 V7.0.0 (Mar. 2006).

Wei et al., "ACK and NACK Feedback Schemes for HARQ Operation," IEEE 802.16 Broadband Wireless Access Working Group, IEEE C802.16m-08/294r4 (May 5, 2008).

Yu et al., "RS Downlink HARQ on Dedicated Channel," IEEE 802.16 Broadband Wireless Access Working Group, IEEE C802.16j-07/415, (Jul. 5, 2007).

IEEE Standard for Local and metropolitan area networks; Part 16: Air Interface for Fixed Broadband Wireless Access Systems, IEEE Std. 802.16/2001 (Apr. 2002).

IEEE Standard for Local and metropolitan area networks; Part 16: Air Interface for Fixed Broadband Wireless Access Systems— Amendment 2: Physical and Medium Access Control Layers for Combined Fixed and Mobile Operation in Licensed Bands, IEEE Std. 802.16e-2005 (Feb. 2006).

Third Generation Partnership Project, "Technical Specification Group Radio Access Network; High Speed Downlink Packet Access (HSDPA); Overall description; Stage 2 (Release 7)," 3GPP TS 25.308 V7.3.0 (Jun. 2007).

Third Generation Partnership Project, "Technical Specification Group Radio Access Network; High Speed Downlink Packet Access (HSDPA); Overall description; Stage 2 (Release 6)," 3GPP TS 25.308 V6.4.0 (Mar. 2007).

(56) References Cited

OTHER PUBLICATIONS

Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).
Third Generation Partnership Project, "Technical Specification Group Radio Access Network; High Speed Downlink Packet Access (HSDPA); Overall description; Stage 2 (Release 8)," 3GPP TS 25.308 V8.2.0 (May 2008).
Third Generation Partnership Project, "Technical Specification Group Radio Access Network; High Speed Downlink Packet Access (HSDPA); Overall description; Stage 2 (Release 7)," 3GPP TS 25.308 V7.7 (May 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.3.0 (May 2008).
Third Generation Partnership Project, "Technical Specification Group Radio Access Network; Physical layer procedures (Release 8)," 3GPP TS 36.213 V1.2.0 (May 2007).
Third Generation Partnership Project, "Technical Specification Group Radio Access Network; LTE Physical Layer—General Description (Release 8)," 3GPP TS 36.201 V1.2.0 (Jun. 2007).
Third Generation Partnership Project, "Technical Specification Group Radio Access Network; Evolved Universal Terrestrial Radio Access (E-UTRA); LTE Physical Layer—General Description (Release 8)," 3GPP TS 36.201 V8.1.0 (Nov. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.1.0 (Jun. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.5.0 (May 2008).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.2.0 (May 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).
WiMax Forum Mobile System Profile—Release 1.0 Approved Specification—(Revision 1.4.0: May 2, 2007).
Third Generation Partnership Project, "3rd Generation Partnership Project; Technical Specification Group Radio Access Network; High Speed Downlink Packet Access (HSDPA); Overall description; Stage 2 (Release 7)," 3GPP TS 25.308 V7.4.0 (Sep. 2007).
Third Generation Partnership Project, "Technical Specification Group Radio Access Network; Evolved Universal Terrestrial Radio Access (E-UTRA); Physical layer procedures (Release 8)," 3GPP TS 36.213 V8.0.0 (Sep. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V2.0.0 (Nov. 2007).
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 V1.0.0 (Nov. 2007).
Alcatel-Lucent, "DL Control Signaling and Multiplexing for VoIP," 3GPP TSG RAN WG1 Meeting #48bis, R1-071721, St. Julians, Malta (Mar. 26-30, 2007).
NTT Docomo et al, "Persistent Scheduling in E-UTRA," 3GPP TSG RAN WG1 Meeting #50, R1-073705, Athens, Greece (Aug. 20-24, 2007).
Ericsson, "Comparison of scheduling methods for LTE," TSG-RAN WG2 Meeting #57, R2-070796, St. Louis, USA (Feb. 12-16, 2007).
Intel Corporation, "Persistent Scheduling," 3GPP TSG RAN WG2 Meeting #54, R2-062113, Tallinn, Estonia (Aug. 28-Sep. 1, 2006).
LG Electronics, Inc., "Discussion on Persistent Scheduling," 3GPP TSG-RAN WG2 #59, R2-073510, Athens, Greece (Aug. 20-24, 2007).
Samsung, "Discussion on control signalling for persistent scheduling of VoIP," 3GPP TSG-RAN2 Meeting #56, R2-063482, Riga, Latvia (Nov. 6-10, 2006).
Motorola, "Resource Allocation Scheme for 802.16m," S802.16m-07/258 (Nov. 2007).
Nokia, "Uplink Scheduling for VoIP," 3GPP TSG-RAN WG2 Meeting #57, R2-070476, St Louis, Missouri, USA (Feb. 12-16, 2007).
NTT Docomo, Inc., "Uplink resource allocation scheme," 3GPP TSG RAN WG2 #54, R2-062164, Tallinn, Estonia (Aug. 28-Sep. 1, 2006).

\* cited by examiner

BASE STATION CONFIGURED FOR PERSISTENT RESOURCE ALLOCATION

CROSS REFERENCE TO RELATED APPLICATIONS

This application is a continuation of U.S. patent application Ser. No. 14/271,596, filed May 7, 2014, which is a continuation of U.S. patent application Ser. No. 13/861,013, filed Apr. 11, 2013, which issued as U.S. Pat. No. 8,732,541 on May 20, 2014, which is a continuation of U.S. patent application Ser. No. 12/204,719, filed Sep. 4, 2008, which issued as U.S. Pat. No. 8,423,853 on Apr. 16, 2013, which claims the benefit of U.S. Provisional Application No. 61/013,622 filed Dec. 13, 2007 and U.S. Provisional Application No. 60/971,526, filed Sep. 11, 2007. The above-referenced applications are incorporated by reference as if fully set forth.

FIELD OF INVENTION

The invention relates to the field of wireless communications. More particularly, the invention relates to the field of resource allocation in a wireless communication system.

BACKGROUND

Wireless communication systems may support discontinuous transmission in which the various parties to a communication link use resources only as needed. Limiting the allocation and consumption of resources to those devices actively engaged in communications increases the efficiency of a wireless communication system. However, each device may need to request an allocation of resources before it is granted the opportunity to communicate. The request and grant of communication resources can itself consume a large amount of resources that otherwise could be used to support additional users or provide increased bandwidth to active users.

It is desirable to minimize the amount of resources consumed in requesting and granting resources for discontinuous communications. However, there remains the need to maximize the flexibility in generating access requests and allocating the resources associated with the access requests.

SUMMARY

Methods and apparatus for communicating, monitoring, controlling and utilizing persistent allocation of downlink and uplink resources are described herein. In one aspect, a method of persistent resource allocation is disclosed in which a base station schedules a candidate client station for a persistent resource allocation, associates the candidate client station with a shared NACK channel, configures a persistent allocation information element indicating the persistent resource allocation and transmits the persistent allocation information element. The base station may further configure the persistent allocation information element to indicate a pseudo random code which defines the shared NACK channel. It may also receive a NACK message over the shared NACK channel and transmit an indication of a set of recent changes made to persistent allocations corresponding to a set of client stations associated with the shared NACK channel. In addition, it may receive a NACK message over the shared NACK channel, determine that no changes have been made to persistent allocation corresponding to a set of client stations associated with the shared NACK channel and transmit a no-changes-made indication to the set of client stations. The base station may detect little or no energy from the candidate client station on the persistent resource allocation and retransmit the persistent allocation information element. The persistent resource allocation may be configured to carry an HARQ packet stream and the base station may detect a series of failed HARQ packet transfers and retransmit the persistent allocation information element.

In another aspect, a method of persistent uplink resource allocation is disclosed in which an element of the communication network communicates a persistent resource allocation information element, receives a NACK on a predetermine shared NACK channel and retransmits at least a portion of the persistent resource allocation information element to a group of client stations associated with the shared NACK channel.

A method of persistent uplink resource allocation is also disclosed in which a resource map is received. An attempt is made to decode a persistent allocation information element within the resource map. A map NACK is selectively transmitted over a shared map NACK channel if the persistent allocation information element fails to successfully decode. In one aspect, transmission of data is ceased on an uplink channel associated with a most recently received downlink persistent allocation. According to one aspect, a map NACK channel recovery process begins in response to a failure to receive an expected response to transmission of the map NACK. According to another aspect, a second persistent allocation information element is received that indicates that a NACK message was received and no changes were made.

Also described is a base station which executes a method of recovering from an error condition in a system using a shared NACK channel. The base station sends an uplink persistent allocation information element specifying a first persistent allocation for a client station. If the base station detects little or no signal energy from the client station on the first persistent allocation, the base station resends the uplink persistent allocation information element to the client station.

Alternatively, the base station may recover from an error condition by sending an persistent allocation information element specifying a first allocation to a client station for a purpose of carrying HARQ traffic, by detecting a series of failed HARQ packet transfers associated with the first allocation, and resending the persistent allocation information element to the client station.

Also described is a client station which executes a method of recovering from an error condition in a system using a shared map NACK channel by receiving a persistent allocation information element from a base station for a purpose of carrying HARQ traffic over a first allocation, detecting a series of failed HARQ packet transfers associated with the first allocation and by sending a map NACK channel error message to the base station.

A base station may establish a global map NACK channel for persistent allocation assignments, send an uplink persistent allocation information element to a client station indicating an associated shared NACK channel, receive a global NACK message on the global map NACK channel and resend a set of recently changed persistent allocation information elements to a set client stations associated with two or more shared NACK channels.

In one aspect, a client station fails to receive a persistent allocation information element while no persistent allocation is currently assigned to the client station. The client station determines that no shared map NACK channel assignment is active and sends a global map NACK message on the global map NACK channel.

Further described is a base station having a group scheduler configured to schedule a candidate client station for persistent uplink resource allocation, a persistent DL/UL IE generator configured to associate the candidate client station with a shared map NACK channel and to configure a persistent allocation information element identifying a persistent resource allocation and a transmitter configured to transmit the persistent allocation information element. The base station may be configured to receive a map NACK message over the shared map NACK channel and the persistent DL/UL IE generator is further configured to determine a set of recent changes made to persistent allocations corresponding to a set of client stations associated with the shared NACK channel for retransmission.

In yet another aspect, the client station has a receiver configured to receive a resource map, a DL/UL-map module configured to determine whether a persistent allocation information element is within the resource map and to attempt to decode the persistent allocation information element, and a NACK module configured to selectively create a map NACK message for transmission over a shared map NACK channel if the DL/UL module is unable to successfully decode the persistent allocation information element.

Certain additional means for implementing all of these aspects are also disclosed. Many aspects may be stored in a computer-readable medium. Additional aspects of the invention are detailed in the description provided herein and associated figures.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE PREFERRED EMBODIMENTS

Figure 1:
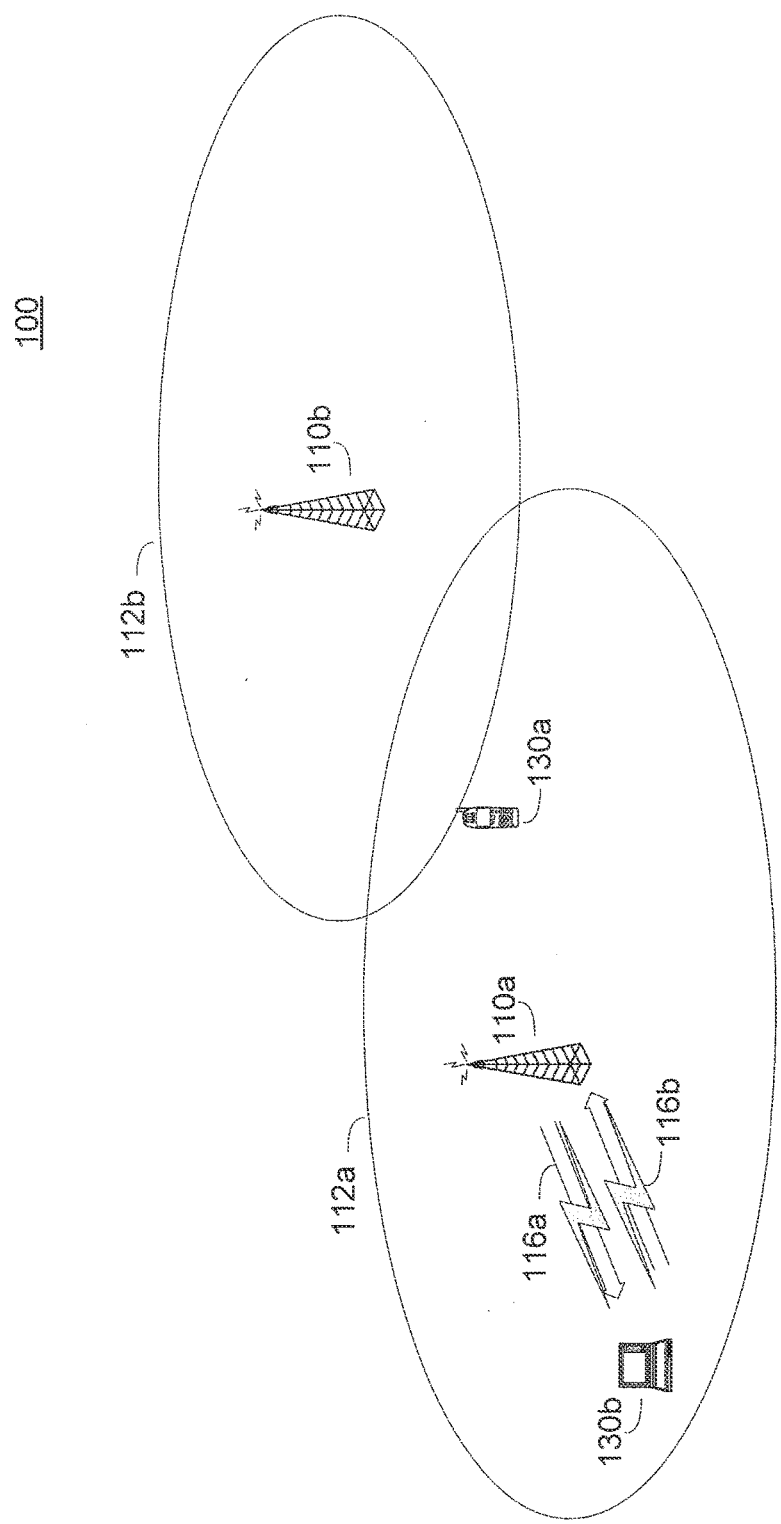
FIG. 1 is a simplified functional block diagram of an embodiment of a wireless communication system.

Methods and apparatus for communicating and utilizing persistent allocation of downlink or uplink resources are described herein. In this description, the communication path from the base station to the client station is referred to as a downlink (DL) and the communication path from the client station to the base station is referred to as an uplink (UL).

When the base station assigns a standard non-persistent downlink or uplink allocation for use by a client station, the allocation is valid for a predetermined frame, such as a frame in which the allocation is granted or the frame following the frame in which the allocation is granted, depending on the allocation relevancy. In contrast, when a base station assigns a persistent downlink or uplink allocation to a client station, the allocation typically remains valid for multiple future downlink or uplink frames. Thus, the client station does not need to repeat a request for uplink resources periodically over a long series of frames. Nor does the base station need to expressly and repeatedly identify a downlink or uplink resource allocation in a series of downlink or uplink map information element (IE) messages when the base station implements persistent resource allocation.

In some systems, a client station requests a persistent downlink or uplink allocation when the client station is producing a data stream which is predictably periodic and in which the packets are generally fixed in size. For example, when a client station has established a voice over Internet protocol (VOIP) connection, a steady stream of voice packets will typically be produced. The base station can verify that the downlink or uplink resource request meets the criteria for persistent resource allocation and allocate persistent downlink or uplink resources as part of a persistent downlink or uplink map information element (IE) message that is transmitted to the client stations in the system.

In a typical system, the base station has the ability to determine that a client station is a candidate for a persistent downlink or uplink resource allocation. For example, the base station can determine that a client station is a candidate for a persistent downlink or uplink resource allocation based on one or more parameters. The parameters can include, for example, repeated requests for uplink resource allocations from the client station, the consistency of the resource allocation requested, stability of characteristics of a wireless channel between the base station and the client station, knowledge of the packet arrival distribution, and the type of connection. As an example, if the connection is in support of VOIP communication, the base station typically knows that the packet arrival pattern is a good candidate for persistent resource allocation.

The persistent allocation remains dedicated to the client station in future frames until a predetermined terminating event, such as a passage of time, passage of a predetermined number of frames, the base station notifying the client station that the resource has been deallocated, a base station reallocating all or part of resources allocated to another client station, and the like or some combination thereof. The base station may deallocate a persistent resource by sending a revised persistent downlink or uplink map IE which no longer allocates a persistent resource to the client station or reallocates resources to the client station. In one aspect, the base station sends an express deallocation message.

The base station can group the client station resource request and resource allocation to any one of multiple persistence groups. The base station can select a persistence group for a particular client station based on such factors as a traffic arrival pattern, a power class of the client station, load balancing at the base station, and the like or some combination thereof.

The base station can allocate uplink resources to the client stations in each of the persistence groups such that members of each persistence group transmit in a frame distinct from any other persistence group. Similarly, the base station can allocate persistent resources to the client stations in each of the persistent groups such that members of each persistence group transmit in a frame distinct from any other persistence group. If the base station allocates both persistent downlink and uplink resources to a particular client station, the persistence groups will coincide. For example, each persistence group can be associated with a group cycle number and a persistent resource allocation can be valid for uplink frames associated with the group cycle index. In one embodiment, the persistence groups can be time cycled in a round-robin schedule in order to provide uniform access and a uniform rate across the multiple persistence groups. A simple implementation utilizes the frame number and group cycle index to identify the active persistence group associated with a particular frame. The active persistence group can be identified by determining the modulo function of the frame number and the total number of persistence groups, typically notated as MOD (frame number, N), and comparing the result against the group cycle index, where N represents the number of persistence groups. (The modulo operation returns the remainder of division of one number by another. Given two numbers, a (the dividend) and x (the divisor), mod (a,x) is the remainder, of division of a by x. For instance, the expression MOD (7,3) would evaluate to 1, while MOD (9,3) would evaluate to 0.)

The client station need not have any knowledge of its group cycle index and only needs to know the number of persistence groups, N. The client station can determine its group cycle index by determining the value of MOD (frame number, N) for the first frame number for which it is allocated persistent downlink or uplink resources. Groups may also be identified and associated with client stations explicitly by communicating a period parameter in the persistent allocation IE. In one aspect, an express indication of the period of the persistent allocation is sent in the UL-MAP information element, thus eliminating the need for the use of a modulo function.

In a typical OFDMA system, the base station can distinguish data coming from the various client stations according to time (number of symbols) and frequency (number of subcarriers). Of course in other systems, the base station may distinguish data coming from the various client stations according to some other physical layer (PHY) characteristics associated with the system.

To reduce overhead, the base station typically does not assign individual physical layer units to the client stations. Instead, the physical layer units are grouped together into "allocation units." The base station assigns resources to the client stations by specifying allocation units, rather than designating individual physical layer units. An allocation unit can be, for example, a combination of a predetermined number of subcarriers and symbols. In one embodiment, a minimum allocation unit is referred to as a "slot," and a slot encompasses a predetermined number of subcarriers in one or more OFDMA symbols.

According to IEEE 802.16, communication on both the uplink in the downlink are divided into frames of fixed a length. Each frame includes a downlink subframe and uplink subframe. The downlink subframe typically includes link management transmissions (such as synchronization signals and the like), overhead channels, a number of downlink allocation units for carrying user data from the base station to the client stations as well as other types of overhead and data transmissions. The uplink subframe includes many of these same categories of transmissions, including uplink allocation units for carrying user data from the client station to the base station and control signaling channels for system control, administration and the like.

Modulation is the process of encoding information onto a signal for transmission. Many modulation schemes are well known in the art including binary phased shift keying (BPSK), quadrature phase shift keying (QPSK) and quadrature amplitude modulation (QAM.) Modulation schemes differ from one another according to the amount of data carried by any one symbol. Higher order modulation schemes carry more data per symbol. For example, a 16 QAM symbol carries 4 bits of data per symbol while BPSK modulation carries only one bit of data per symbol.

Higher order modulation schemes are more susceptible to channel conditions than lower order modulation schemes. Thus, use of a higher order modulation scheme is more likely to result in errors than use of a lower order modulation scheme under poor channel conditions.

However higher order modulation schemes are more efficient in terms of the amount of information that can be transferred over the wireless link in a fixed period of time. Thus, within a fixed period of time, more data can be transferred over the link using a higher order modulation scheme than a lower order modulation scheme if channel conditions are good. Thus, transmissions using lower order modulation schemes are more robust, but less efficient, and transmissions using higher order modulation schemes are less robust but more efficient.

In order to improve the performance of the wireless link, error correction coding, such as forward error correction (FEC), can be applied at the transmitter. Using complex error correction schemes, some type of redundancy is introduced in the data before transmission. The code rate typically refers to the length of the uncoded information divided by the length of the resulting encoded information. The redundancy can be used to correct for errors which are introduced by the wireless channel. The effectiveness of a coding scheme is measured in terms of coding gain, which can be expressed as the difference between the signal to noise level required to reach the same bit error rate level for encoded and uncoded data. Modern error correction coding techniques provide substantial coding gains. However, due to the redundancy introduced, the use of error correction coding typically decreases the effective rate at which data is transmitted over the channel. Therefore, transmissions using codes having higher redundancy rates are more robust, but less efficient than transmissions using codes having lower redundancy rates.

The IEEE 802.16e standard and its progeny define a variety of modulation and coding scheme (MCS) combinations. The MCS specifies a type of modulation as well as a type of forward error correction which the client station is to use on the uplink transmission. The MCS combinations accommodate the large variation in performance associated with the client stations scattered throughout the coverage area. Proper selection of an MCS combination is important to both the efficiency and performance of a wireless link.

When the base station assigns an allocation unit to a specific client station, it also specifies the MCS combination to be used on the allocation. This may be typical for both persistent and nonpersistent resource allocations.

Once the base station sends a persistent resource allocation, generally it need not resend the resource allocation unless a change to the downlink or uplink resource allocations makes it advantageous to resend the resource allocation. For example, a new full or partial persistent uplink map IE may be sent when there is a need to change the size of the allocation. Such a size change may occur if the operating conditions of the client station assigned a persistent allocation are altered or otherwise change to such a degree that a new MCS combination is advantageous. Therefore the base station typically resends the persistent downlink or uplink map IE to identify the new MCS combination and assign the client station fewer or more allocation units as appropriate. In addition, a new persistent downlink or uplink map IE may be sent when a voice activity state changes, thus changing the rate of occurrence of the persistent allocation. In addition the base station typically resends the persistent uplink map IE if requested by the client station to do so, and may alter a persistent downlink map accordingly. Of course, the base station can be configured to periodically resend the persistent downlink or uplink map IE even if no changes have occurred to permit client stations in the base station coverage area to verify the persistent downlink and uplink resource allocations. In addition, there may be several other instances in which persistent downlink and uplink map IE are resent, some of which are discussed below.

The descriptions contained herein generally focus on Orthogonal Frequency Division Multiple Access (OFDMA) wireless communication systems, and particularly are directed towards IEEE 802.16 wireless communication systems or wireless communication systems based on IEEE 802.16e as modified or otherwise extended by the methods and apparatus described herein. However, the implementation of persistent downlink or uplink resource allocation scheme in an IEEE 802.16e system is used merely as an example. The use of persistent downlink or uplink resource allocation scheme can be implemented in virtually any type of wired or wireless communication system.

FIG. 1 is a simplified functional block diagram of an embodiment of a wireless communication system 100. The wireless communication system 100 includes a plurality of base stations 110a, 110b, each supporting a corresponding service or coverage area 112a, 112b. Each base station 110a and 110b can be coupled to one another and a supporting network (not shown) via a combination of a wired and wireless links. The base station, for example 110a, can communicate with wireless devices within its coverage area 112a. For example, the first base station 110a can wirelessly communicate with a first client station 130a and a second client station 130b within the coverage area 112a over a downlink 116a and an uplink 116b.

Although for simplicity only two base stations are shown in FIG. 1, a typical wireless communication system 100 includes a much larger number of base stations. The base stations 110a and 110b can be configured as cellular base station transceiver subsystems, gateways, access points, radio frequency (RF) repeaters, frame repeaters, nodes or any wireless network entry point.

In a typical system, the base stations 110a and 110b also communicate with each other and a network control module (not shown) over backhaul links (also not shown.) The backhaul links may include wired and wireless communication links. The network control module provides network administration and coordination as well as other overhead, coupling and supervisory functions for the wireless communication system. The network control module also couples the wireless link system to other communications systems such as the Internet, convention telephone systems and the like.

Although only two client stations 130a and 130b are shown in the wireless communication system 100, typical systems are configured to support a large number of client stations. The client stations 130a and 130b can be mobile, nomadic or stationary units. The client stations 130a and 130b are often referred to as, for example, mobile stations, mobile units, subscriber stations, wireless terminals or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter reading equipment or the like in may include a display mechanism, microphone, speaker and memory.

In one example, the wireless communication system 100 is configured for Orthogonal Frequency Division Multiple Access (OFDMA) communications. For example, the wireless communication system 100 can be configured to substantially comply with a standard system specification, such as IEEE 802.16e or some other wireless standard. The wireless communication system 100 can support the persistent downlink or uplink resource allocation described herein as an extension to the system standard or as part of a system standard.

The wireless communication system 100 is not limited to an OFDMA system, and use of persistent downlink or uplink resource allocation described herein is not limited to application in OFDMA systems. The description is offered for the purposes of providing a particular example of the operation of persistent downlink or uplink resource allocation in a wireless communication environment.

Each base station, for example 110a, can supervise and control the communications within its respective coverage area 112a. Each active client station, for example 130a, registers with the base station 110a upon entry into the coverage area 112a. The client station 130a can notify the base station 110a of its presence upon entry into the coverage area 112a, and the base station 110a can interrogate the client station 130a to determine the capabilities of the client station 130a.

The base station 110a assigns one or more temporary identifiers to each data stream coming from a particular client station 130a for use in identifying the a data stream to the base station 110a. The temporary identifier can be referred to as a Connection Identifier (CID). The system can allocate a predetermined range of numbers or characters for the CID, and reserves a number of bits necessary to support the maximum CID value in each message requiring a CID value. More than one CID may be associated with a particular client station. For example, if a client station is conducting a voice over Internet protocol (VoIP) call while also downloading information from the Internet, the VoIP data stream will be assigned one CID and the Internet data stream will be assigned another CID. A base station allocates resources for a particular CID, rather than for particular client station. In one embodiment, the base station may allocate a persistent resource for one data connection associated with a client station while continuing to sporadically assign non-persistent allocations to another data connection associated with the same client station on an as needed basis. Thus, although for simplicity's sake a persistent allocation is typically referred to herein as assigned to a particular client station, and many systems, the persistent allocations are assigned per connection rather than per client station.

The client stations 130a and 130b communicate information to the base station 110a on the uplink. For example the client stations report information related to current operating conditions as well as request uplink resources. According to IEEE 802.16, each base station, for example 110a, can allocate some resources to support one of more random access channel (RAC), dedicated control channel, media access control layer (MAC) signing, channel quality indication channel (CQICH), out of band signaling, piggy back messaging or other control signaling path used by the client stations 130a and 130b for such uplink communications. According to IEEE 802.16, one such a dedicated channel for transmission of allocation requests is referred to as a fast feedback channel.

The base station 110a can periodically allocate resources to support the control signaling channel. In one embodiment, the base station 110a can support one or more random access channels, dedicated channels etc. in each uplink frame. For example, a base station 110a can allocate a portion of the uplink resources to one or more random access and/or dedicated channels. The base station 110a can allocate, for example, a time, duration, and number of OFDM subcarriers on the uplink portion for the random access and/or dedicated channels. Each of the random access and/or dedicated channel parameters may be static or may be dynamic.

The client station 130a may transmit a bandwidth request to the base station 110a using the random access channel, dedicated control signaling channel or other channel. In response to the request, the base station 110a may allocate uplink resources to the client station 130a.

The wireless communication system 100 can reduce the need for a continual request and allocation of resources by utilizing persistent uplink resource allocations. A client station, e.g. 130a may request a persistent resource allocation or a base station, e.g. 110a may determine that a client station 130a is a candidate for a persistent uplink resource allocation. Similarly, a base station 110a may determine that a particular client station 130a is a good candidate for persistent downlink resource allocation, and may allocate persistent downlink resources to eliminate the overhead and resources needed to continually communicate downlink resource allocations to the client station.

Each of the base station 110a and client station 130a can implement one or more processes for detecting and/or communicating an error in the receipt or processing of persistent resource allocation assignments. For example, each client station 130a can affirmatively acknowledge (ACK) receipt of a persistent downlink or uplink resource allocation IE message. Conversely, each client station 130a can communicate a negative acknowledgement (NACK) upon determining a failure to receive a persistent downlink or uplink resource allocation IE message or otherwise determining an inability to decode the persistent downlink or uplink resource allocation IE message sent by a serving base station, e.g. 110a.

The base station 110a can determine the presence of the error condition, either through failure to receive an affirmative acknowledgement, through receipt of a negative acknowledgement, or via some other process. The base station 110a can retransmit the persistent downlink or uplink resource allocation IE message in response to determining the error condition. In one embodiment, the base station 110a can retransmit the entire persistent downlink or uplink resource allocation IE message. In another embodiment, the base station 110a can retransmit a portion of the persistent downlink or uplink resource allocation IE message that relates to the client station 130a communicating the error condition.

Figure 2:
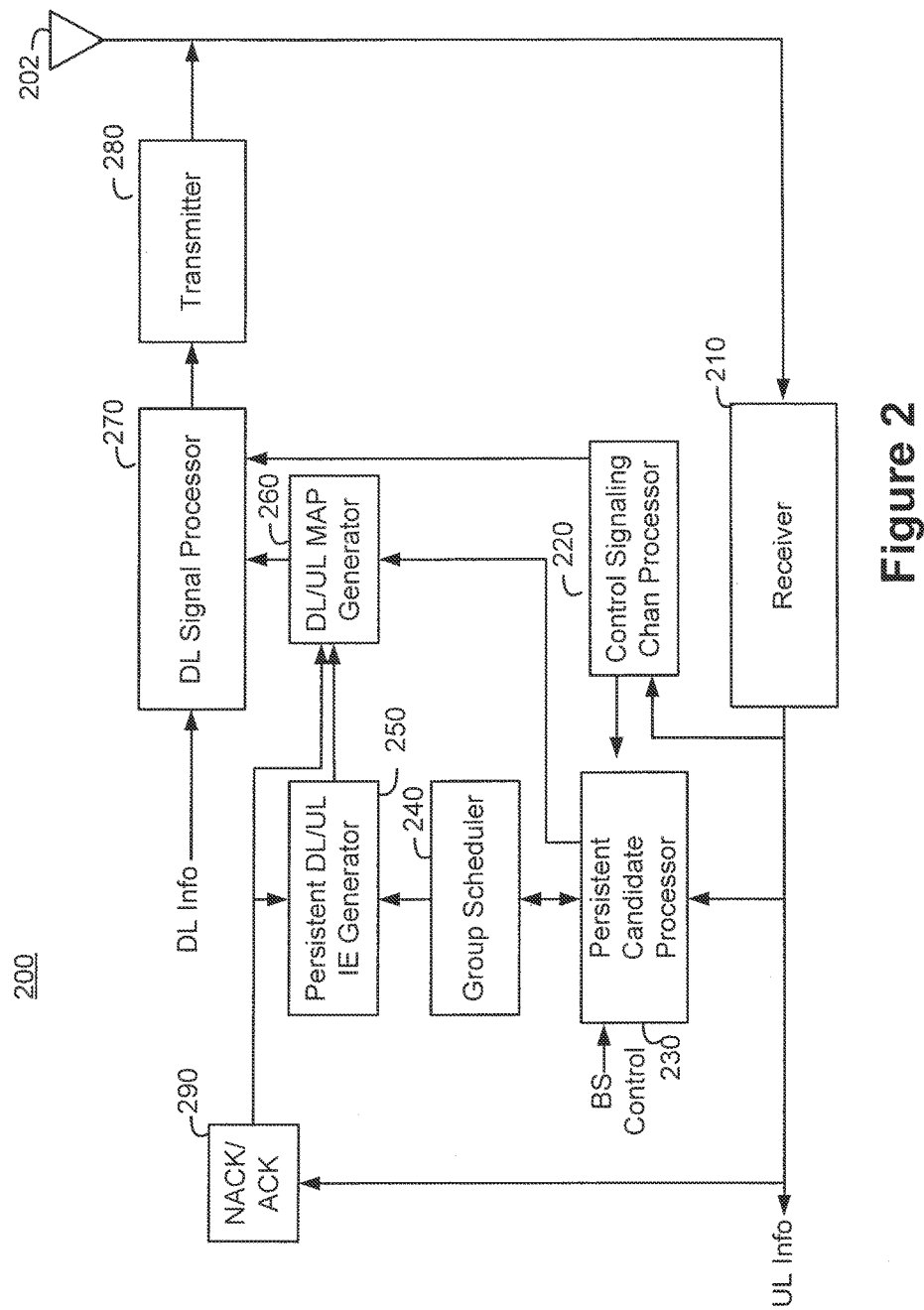
FIG. 2 is a simplified functional block diagram of an embodiment of a base station implementing persistent downlink or uplink resource allocation.

FIG. 2 is a simplified functional block diagram of an embodiment of a base station 200 implementing persistent downlink and uplink resource allocation and resource allocation retransmission for error correction. The base station 200 can be, for example, one of the base stations in the wireless communication system of FIG. 1.

The base station 200 includes an antenna 202 that can be coupled to a receiver 210 and transmitter 280 within the base station 200. Although FIG. 2 illustrates a single antenna 202, the antenna 202 can be one or more antennas configured to support multiple transmit and receive operating bands, multiple input multiple output (MIMO) operation, beam steering, special diversity and the like. If the base station 200 supports frequency division multiplexing of the transmit and receive bands, the base station 200 can include a duplexor (not shown) to isolate the transmit signals from the receiver 210. The receiver 210 and transmitter 280 can be distinct or can be part of a transceiver.

The receiver 210 is configured to receive the uplink transmissions transmit by a client station (not shown), such as one of the client stations of FIG. 1. Initially, a client station can synchronize and register with a base station 200 once the client station enters a coverage area of the base station 200 or upon waking up from a sleep or idle state.

The receiver 210 can receive a request for uplink resources in a request from a subscriber transmitted over a random access channel, fast feedback channel, piggyback data channel, MAC signaling, CQICH signaling, in band or out of band messaging, dedicated control channel or any other type of control signaling channel. A control signaling channel processor 220 is coupled to the receiver 210 and operates to determine the presence of an uplink allocation request. The control signaling channel processor 220 may also perform associated duties in combination with one or more functional modules to identify the requesting client station and to identify the nature and size of the resource allocation request. For example, the control signaling channel processor 220 may operate in conjunction with a downlink signal processor 270 to communicate additional information to the client station that enables the client station to communicate the additional bandwidth, nature, and identity information.

A persistent candidate processor 230 can process the downlink and uplink resource allocation request, for example, processed by the control signaling channel processor 220 to determine whether the requesting client station is a good candidate for persistent resource allocation. The persistent candidate processor 230 can also determine if a client station is a good candidate for persistent downlink resource allocation. The persistent candidate processor 230 can, for example, determine an express request for a persistent channel or may monitor one or more parameters to determine whether the client station is a candidate for persistent resource allocation in the downlink, uplink, or both. In one aspect, the express request for persistent channel is made by another element of the base station or infrastructure.

The persistent candidate processor 230 may also monitor the received signal to determine a channel characteristic associated with the requesting client station. Alternatively, the persistent candidate processor 230 may monitor the received signal for feedback information from the client station characterizing its channel characteristics. Such signaling may be processed by the control signaling channel processor 220.

The persistent candidate processor 230 can be coupled to a group scheduler 240 and to a downlink/uplink map generator 260. If the persistent candidate processor 230 determines that the resource request and client station are not candidates for persistent allocation, the persistent candidate processor 230 can signal the DL/UL map generator 260 to generate a non-persistent downlink or uplink resource allocation.

If the persistent candidate processor 230 determines that the resource request and client station are good candidates for persistent allocation, the persistent candidate processor 230 can communicate the information to the group scheduler 240. The group scheduler 240 can be configured to schedule the persistent allocation to one or more group from a predetermined number of groups. The group scheduler 240 can determine the group or groups based on a variety of parameters and metrics. For example, the group scheduler 240 can attempt to balance persistent allocations across each of the groups or may operate to optimize some other constraint or metric.

The group scheduler 240 can communicate the group information to a persistent DL/UL map IE generator 250 that operates to generate the persistent DL/UL allocation IE for the group, including the persistent resource allocation for the requesting client station.

The persistent DL/UL IE generator 250 can communicate the persistent DL/UL allocation IE to the DL/UL map generator 260 for inclusion in the respective DL-MAP or UL-MAP. The DL/UL map generator 260 can be configured to generate the DL-MAP and UL-MAP including any persistent and non-persistent resource allocations.

The DL/UL map generator 260 couples the UL-MAP information element to the downlink signal processor 270 which creates the final message for transmission over the downlink. The downlink information can be coupled to the transmitter 280 for transmission in the coverage area supported by the base station 200.

The base station 200 can determine and communicate persistent resource allocations periodically, in response to an updating event or trigger, or some combination thereof. In one embodiment, the base station 200 can be configured to update and transmit persistent resource allocation IEs each frame, where a frame corresponds to a predetermined number of symbols, packets, or some other measure of information.

The base station 200 can also include a NACK/ACK processing module 290 coupled to the receiver 210 output. The NACK/ACK processing module 290 can be configured to determine, for example, the presence of a persistent resource allocation map error condition. (A map error occurs when a client station fails to properly receive the persistent downlink or uplink map IE in a frame which may have included a change to its current persistent allocation configuration, for example, such as, an initial grant of a new persistent allocation, a change to a currently active persistent allocation or termination or suspension of a currently active persistent allocation.) The NACK/ACK processing module 290 can be configured to determine the error condition expressly or implicitly. The NACK/ACK processing module 290 can determine the error condition expressly by monitoring the received signals for ACK and/or NACK messages communicated by the client stations. The NACK/ACK processing module 290 can determine the error condition implicitly by monitoring the received signals and monitoring for the absence of received signals over persistent resource allocations.

The NACK/ACK processing module 290 can communicate the presence of an error condition to the DL/UL map generator 260 and the persistent DL/UL IE generator 250. The NACK/ACK processing module 290 can also determine the identity of a client station or group of client stations associated with the error condition. The NACK/ACK processing module 290 can communicate the identity information to the DL/UL map generator 260 and the persistent DL/UL IE generator 250.

The persistent DL/UL IE generator 250 can generate a persistent DL or UL allocation IE that repeats at least a portion of a previously transmitted persistent allocation IE. The repeated portion of the persistent allocation IE can correspond to the identified client station or group of client stations associated with the error condition. The DL/UL map generator 260 generates the error correction DL-MAP or UL-MAP, as needed, and retransmits at least the portion of a previously transmitted persistent resource allocation IE. In the absence of map error grouping, where the base station is unable to determine which client station or group of client stations transmitted the NACK, the base station may retransmit the entire persistent allocation IE.

Figure 3:
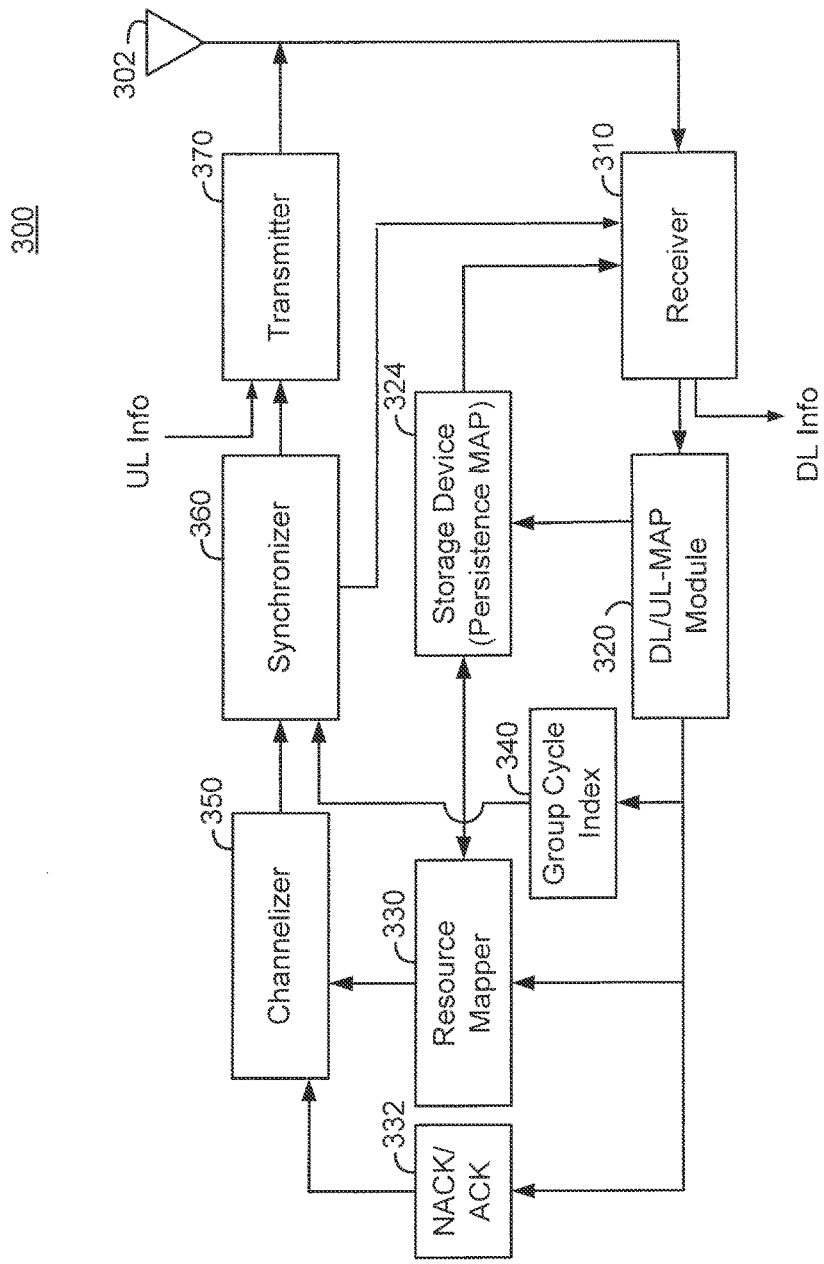
FIG. 3 is a simplified functional block diagram of an embodiment of a client station configured to operate using persistent downlink or uplink resource allocation.

FIG. 3 is a simplified functional block diagram of an embodiment of a client station 300 configured to operate using persistent downlink and uplink resource allocation. The client station 300 can be, for example, one of the client stations illustrated in the wireless system of FIG. 1.

The client station 300 can include an antenna 302 coupled to a receiver 310 and a transmitter 370. Although a single antenna 302 is shown as shared between a transmitter 370 and receiver 310, multiple antennas can be used.

The receiver 310 can be configured to operate to receive the downlink transmissions from a base station such as the base station of FIG. 2. A DL/UL map module 320 coupled to the receiver 310 can be configured to extract the DL-MAP information element and the UL-MAP information element from the downlink signal.

The DL/UL map module 320 can be configured to examine the DL-MAP to determine if the client station 300 has been allocated persistent or non-persistent downlink resources and can examine the UL-MAP to determine whether the client station 300 has been granted uplink resources, and if so, whether the allocation is persistent or non-persistent.

If the DL/UL map module 320 determines that the DL-MAP information element or UL-MAP information element indicates a persistent resource allocation for the client station, the DL/UL-map module 320 can store the persistent DL or UL map IE in a storage device 324. The DL/UL-map module 320 can also communicate a persistent allocation to a group cycle index module 340 that is configured to determine the group cycle index associated with the persistent resource allocation. The group cycle index module 340 can communicate the group cycle index value to a synchronizer 360 to permit the synchronizer 360 to synchronize the UL transmissions to the proper frames. The synchronizer 360 can communicate the group cycle index value to the receiver 310 to synchronize the receiver 310 to the proper downlink frames.

The DL/UL-map module 320 can also communicate the persistent UL-MAP and DL-MAP information to a resource mapper 330. The resource mapper 330 can be configured to compare the current persistent allocation map against the stored persistence map from the storage device 324 to determine the actual resources allocated to the client station 300.

If the UL-MAP or DL-MAP explicitly allocates resources to the client station 300, the resource mapper 330 determines the resources directly from the resource allocation. If neither UL-MAP nor the DL-MAP identifies the client station 300, but instead relies on an earlier communicated persistent allocation, the resource mapper 330 compares the persistent allocations against the stored version to determine if any allocation has been temporarily deactivated, and whether such temporary deactivation affects the resources allocated to the client station 300.

The resource mapper 330 maps the uplink information to the proper resources in a channelizer 350 based on the resource allocation. For example, the resource mapper 330 can be configured to control the subcarriers and symbols that UL information is mapped to in the channelizer 350.

The output from the channelizer 350, which can specify, for example, a series of OFDM symbols, is coupled to the synchronizer 360 that can be configured to synchronize the symbol timing to the timing of the frames in which the uplink or downlink resource is allocated. The output of the synchronizer 360 is coupled to a transmitter 370 that uses the information to create a signal that is upconverted to a desired operating frequency before it is transmitted using the antenna 302. The output of the synchronizer 360 is also coupled to the receiver 310 to facilitate receipt of the downlink allocation.

A NACK/ACK generator 332 can be coupled to the output of the DL/UL-map module 320 and can be configured to generate an appropriate ACK or NACK message based on the ability of the DL/UL-map module 320 to recover and decode the persistent resource allocation IE in the DL-MAP or the UL-MAP. The NACK/ACK generator 332 determines and couples the appropriate NACK or ACK message, if any, to the channelizer 350 for transmission to the base station. The NACK/ACK generator 332 can selectively generate the NACK or ACK message to indicate the successful receipt of a persistent resource allocation IE, the presence or absence of a persistent resource allocation IE error condition and the like.

One issue that is advantageously addressed with respect to persistent allocations is how to handle a map error. A map error occurs when a client station fails to properly receive the persistent downlink or uplink map IE in a frame which may have included a change to its persistent allocation. If a client station experiences a map error, it must refrain from using the persistent allocation or risk transmitting on an allocation assigned to another client station, possibly corrupting both transmissions. Similarly, if a client station experiences a map error in a downlink resource allocation, the client station notifies the base station. In order to avoid failed attempts to decode allocations granted to some other client station, the client station may refrain from attempting to decode data according to its most recent downlink persistent allocation until the error condition is corrected. On the other hand, according to one aspect, the client station may continue to decode data according to its most recent downlink persistent allocation until the map error condition is addressed, relying on the physical layer (PHY) and media access (MAC) layer data error detection/correction mechanisms commonly in use on wireless systems to correct any data errors that may occur if its most recent downlink persistent allocation is no longer valid. In this way, if the map error was associated with a downlink persistent allocation map in which no changes were made to the client station's downlink persistent allocation, the data communication can continue without interruption. Obviously, it is advantageous for the client station to resume the uplink communications on the proper persistent resource allocation or the downlink reception on the proper resource allocation as soon as possible. Therefore, it is advantageous if the persistent allocation method employs an efficient error detection and correction mechanism with very low latency between the occurrence of a map error and the correction of the error condition.

According to the prior art, map errors may be addressed by having the client station send an affirmative acknowledgment (ACK) to the base station every time it properly receives a persistent downlink or uplink map IE which includes an update for the client station. Thus, each client station with a persistent allocation can also be assigned a dedicated persistent ACK channel. One disadvantage of assigning each client station a dedicated persistent ACK channel is that there is significant overhead associated with allocating and using these dedicated ACK channels. Even if allocation of the dedicated ACK channel is restricted to the client stations having higher probability of experiencing map error, such as client stations operating at the edge of the coverage area, the overhead associated with affirmative acknowledgement is still significant. However, according to one aspect of the invention, such an embodiment can be implemented in conjunction with the shared NACK channel described more fully below such that client stations more like to experience a MAP error are assigned either dedicated or sparsely shared NACK channel.

In another embodiment, map errors can be addressed by implementing NACK based error recovery. If a client station experiences a map error, it sends a negative acknowledgment (NACK) message to the base station indicating the map error. According to the prior art, the base station can allocate dedicated NACK channel associated with just one subscriber station. However, using dedicated NACK channels can require a significant amount of system resources as the number of client stations using the system gets large.

According to one aspect of the invention, a limited number of shared NACK channels are used. Each shared NACK channel can be used by more than one subscriber station to indicate a map error. The NACK message can include virtually any number of bits and information. However, in order to reduce overhead, the NACK message can have as few as one bit, whose presence indicates the NACK. In other words, upon receipt of a message on the shared NACK channel, the base station determines that one or more of the client stations associated with the NACK channel has experienced a map error. However if multiple client stations are using the NACK channel, the base station cannot specifically identify the client station which experienced the map error.

The base station can specify the modulation coding scheme assigned to the NACK channels, for example, in the persistent resource allocation IE. However, due to the potentially low bandwidth of the information on the NACK channel, and a desire to successfully report NACK in case of map error, the modulation coding scheme associated with the NACK channels can be fixed to a robust modulation coding scheme and a highly repetitious coding. In one embodiment, the modulation coding scheme associated with the NACK channels is BPSK. In another embodiment, the modulation coding scheme associated with the NACK channels is QPSK with rate 1/2 coding according to a predetermined encoding scheme. Of course, the modulation coding schemes can be virtually any type of fixed or dynamically specified schemes.

According to IEEE 802.16, the client stations use pseudorandom codes to define the MAP NACK channel. In one embodiment, one common pseudorandom code can be assigned to, or otherwise used by, more than one client station to indicate a map error. In such a case, the base station does not know which or how many client stations experienced a map error upon receipt of an error indication on the NACK channel. However, according to one aspect, the base station can determine the group to which the client station is assigned based on the frame in which the map NACK channel message is received and, in some cases, the particular pseudorandom code if more than one is used. When using pseudorandom codes, if more than one client station sends a map NACK channel message, the energy from each client station can be combined in a macrodiversity sense, according to the standard operation of the physical layer, thus enhancing the probability of reception.

FIGS. 4 through 8 detail an embodiment of error correction in persistent uplink resource allocation utilizing NACK messaging. The embodiments and description are focused on correcting persistent downlink or uplink map errors in a time division multiplex (TDM) OFDMA system. However, the apparatus and methods for error correction in persistent resource allocations are not limited to pseudorandom NACK messaging nor are they limited to TDM or OFDMA systems.

NACK Messaging for Persistent Error Correction

Figure 4:
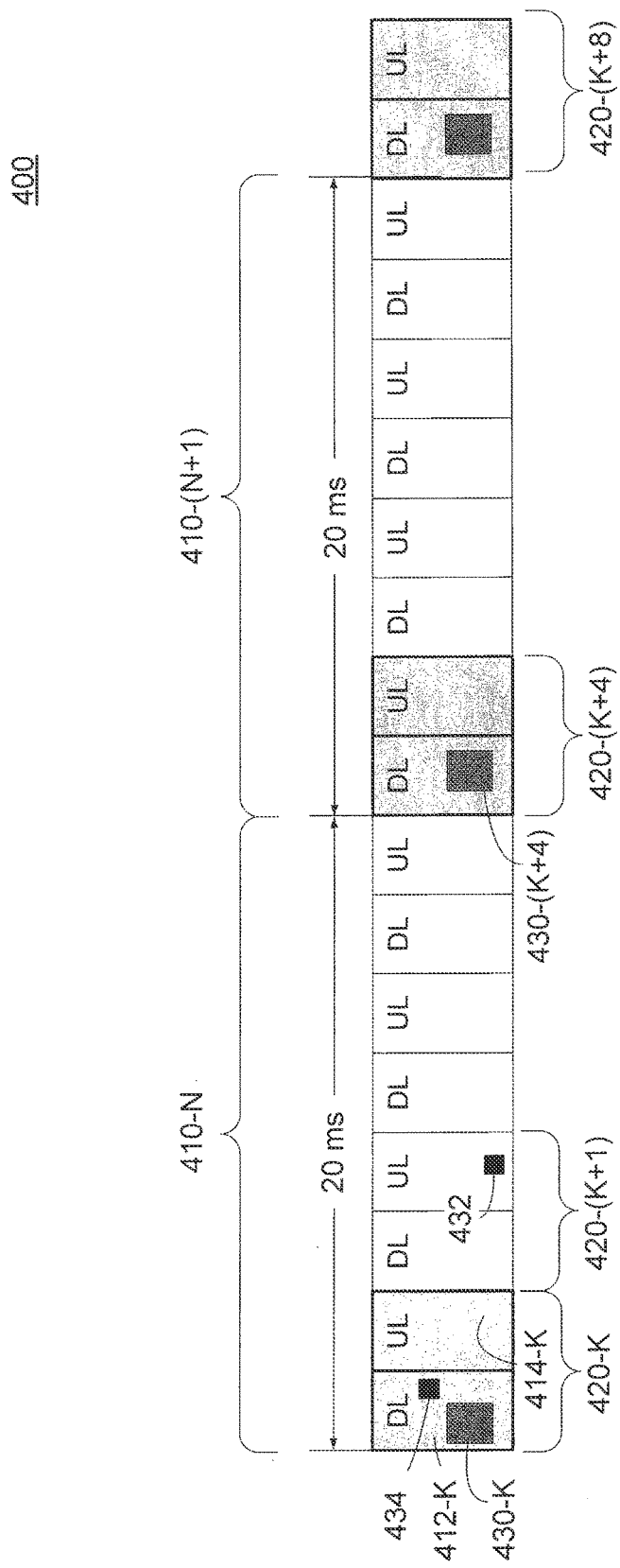
FIG. 4 is a simplified timing diagram of an embodiment of a persistent resource allocation.

FIG. 4 is a simplified timing diagram 400 of an embodiment of a persistent resource allocation. The persistent resource allocation embodiment illustrated in the timing diagram of FIG. 4 supports Time Division Duplex (TDD) operation of downlink and uplink subframes, and multiple persistent resource groups within a persistence period. Additionally, the timing diagram is described in the context of persistent uplink resource allocation with a K+1 allocation relevance (resources allocated in the resource allocation IE message of frame K are active in frame K+1) and persistent downlink resource allocation with a relevance of K. However, the error correction for persistent resource allocation methods and apparatus described herein are not limited to TDD operation, multiple resource groups, or any particular resource allocation relevance. This error recovery mechanism described herein allows for fast error detection for both DL and UL persistent allocations.

The timing diagram 400 of FIG. 4 illustrates a number of successive frames 420, e.g. 420-K through 420-(K+8), where each frame includes a downlink subframe 412 followed by an uplink subframe 414. The frames are further divided into persistence groups 410, such as persistent groups 410-N and 410-(N+1), with each persistence group 410 including a fixed number of frames 420. The period of one persistence group is referred to as an allocation period (AP) or persistent period.

Each frame 420 in a persistence group 410 can be associated with a persistence index, also referred to as a group cycle index, which can be used to identify the position of the frame within the persistence group 410. As described previously, a persistent downlink or uplink resource allocation may be associated with a particular group cycle index. In FIG. 4, the allocation period is four frames. Thus a persistent uplink resource allocated to the Kth UL subframe 414-K applies to the UL subframe in the frame 420-(K+4) of the next persistence group 410-(N+1). Similarly, a persistent downlink resource allocated to the Kth downlink subframe 412-K applies to the downlink subframe in which it occurs (i.e. DL subframe 412-K.) In both the downlink and uplink, persistence resource allocations remain valid for successive frames.

A persistent resource allocation IE 430-K can specify an uplink or downlink persistent resource allocation or both. In one aspect an uplink persistent resource allocation received in a downlink subframe 412-K can have a relevance of K+1, such that the uplink resources allocated in the Kth DL subframe 412-K occur in the K+1 uplink subframe. The persistent resource allocation IE 430-K received in a downlink subframe 412-K can have a relevance of K for downlink allocations, such that the downlink persistent resources 434 allocated in the Kth DL subframe 412-K occur in the Kth downlink subframe.

With a four frame persistent allocation (the typical case for VoIP), it is advantageous to design a system to recover from a map error before the next scheduled persistent allocation. Thus the impact of map error on quality of service (QoS) is substantially the same as for persistent and non-persistent allocations.

The persistence allocation IE 430-K typically allocates the resources using multiple pieces of information. The information in the persistence allocation IE 430-K can include a CID or reduced connection identifier (RCID)—indicating the connection for which this persistent allocation is directed. (A RCID is an abbreviated connection identifier which contains fewer bits than the CID but still completely identifies the connection.) The information can also include an indication of the allocation period, illustrated above as the period of the persistence group 410. If a client station is allocated a persistent allocation in frame K using the persistent IE, the client station also has an allocation in frames K+N*AP, where N represents the number of persistence groups and AP is the allocation period measured in units of frames. A typical IEEE 802.16 allocation period is 20 ms, corresponding to four 5 ms frames, representing the packet emission rate of most commonly used codecs.

The information in the persistence allocation IE 430-K can also include an allocation unit offset, which may also be referred to as a slot offset. The slot offset is used to indicate the start of the persistent allocation relative to a known starting point. For example, in HARQ allocation, the slot offset is relative to the beginning of the HARQ region. As another example, in UL non-HARQ allocation, the offset is relative to the start of the UL sub-frame. The information can also include a number of slots, also referred to as a duration. The duration indicates the number of consecutive slots in the persistent allocation.

The information can also include PHY related information (e.g. modulation and coding, etc.) In addition the information can include an HARQ ACK channel index (in the case of HARQ allocation) that indicates a specific HARQ ACK channel to use to acknowledge receipt of HARQ packets over the persistent resource allocation. The HARQ ACK channel is also allocated persistently with the same period as the data resource assignment so that each HARQ packet received can be properly acknowledged.

In one embodiment, a dedicated map ACK channel can be defined for each subscriber station. The subscriber station sends a map ACK each time it successfully receives a downlink or uplink map IE. However, this approach requires the establishment of a great number of map ACK channels as well as the transmission of many responsive acknowledgments.

To facilitate addressing map errors in a more efficient manner, the information in the persistence allocation IE 430-K can also include a map NACK channel index. The map NACK channel index identifies a specific map NACK channel used by the client station to indicate that it was not able to decode a persistent map IE. As described above, the NACK channel may be assigned to the individual client station or it may be shared among multiple client stations.

Figure 5:
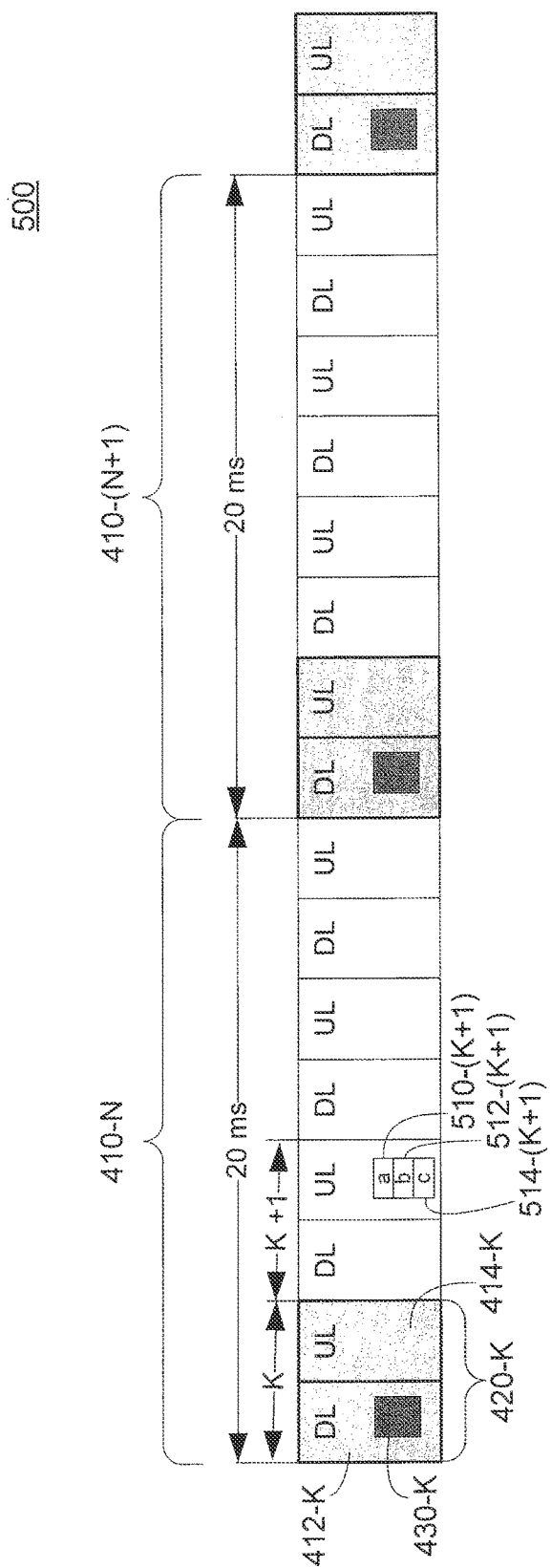
FIG. 5 is a simplified timing diagram of an embodiment of map NACK messaging in a system having persistent resource allocation.

FIG. 5 is a simplified timing diagram 500 of an embodiment of map NACK messaging in a system having persistent resource allocation and multiple map NACK channels.

UL sub-frame 414 K+1 contains the map NACK channels 510-(K+1), 512-(K+1) and 514-(K+1) for Frame K 420-K. The timing diagram 500 illustrates three map NACK channel subgroups, indexed a 510-(K+1), b 512-(K+1), and c 514-(K+1). Client stations are assigned to one of these map NACK sub-groups: a, b or c. This allows the base station to narrow the group of possibly affected client stations when a map NACK message is received.

In an embodiment, the base station allocates one or more fast feedback slots for the purpose of creating one or more map NACK channels. In one aspect, the map NACK Channel (MNCH) can be allocated a pseudorandom code to indicate a map error condition, with different codes assigned to the various subgroups.

The base station receives a NACK message from one or more client stations that did not properly decode a persistent downlink or uplink map IE which may carry information for that client station. In other words the base station receives a NACK message from any users who experienced a map error.

In another embodiment, which can be used with or without the subgroups described above, if the base station receives a map NACK channel message and no changes were made to the persistent allocations in the corresponding frame, the base station sends a short message indicating that there were no changes. In this way the base station avoids resending a full or partial persistent downlink or uplink map information element in favor of a shorter "no changes" message.

Instead of or in conjunction with an express NACK, in one embodiment, rather than use the map NACK channel, the base station can use implicit means to detect map errors. When the client station experiences an uplink map error, it does not transmit in the next frame. Therefore, if the base station detects little or no signal energy was received from a client station over the uplink during its uplink persistent allocation for one or more frames, the base station can infer that the client station experienced a map error. This implicit method of map error detection can be used alone or in conjunction with a map NACK channel or other error detection mechanisms. This implicit error detection mechanism can be used to recover from a map NACK channel error as discussed below.

As described above, or in one aspect the map NACK channel is specified within the persistent downlink or uplink map information element. A problem may occur if a client station experiences a map error in a persistent allocation information element in which it is either initially assigned a map NACK channel or its map NACK channel is changed. In the first case, the client station does not know what map NACK channel to use. In the second case, the client station uses a map NACK channel that the base station does not associate with this client station. In a third case, the client station properly uses a currently assigned map NACK channel but the message is not properly received by the base station. We refer to this problem as a map NACK channel error or map NACK channel assignment error.

There are several embodiments which can address a map NACK channel error. In one embodiment, the base station uses implicit means to detect map NACK error. For example, if the base station detects little or no signal energy was received from a client station during one or more its uplink persistent allocations, the base station can infer that the client station experienced a map error and a map NACK channel error and can resend the persistent allocation information, including the map NACK channel assignment.

In the case in which the map NACK message is properly sent but is not properly received by the base station, in one embodiment, a map NACK channel error can be detected by the client station. If a client station sends a message on the map NACK channel and does not get the expected response from the base station in the next persistent map IE of interest, the client station assumes that the base station did not receive the map NACK channel message. Therefore, according to this aspect, the client station sends another map NACK message. In this case, when a base station receives a map NACK message it does not know whether the NACK message was a first or a second transmission. If this scheme is used, it may be advantageous for the base station to send updates associated with one or more frames worth of updates. For example, in response to each successfully received message on the map NACK channel, the base station can repeat all changes affected within the last two relevant frames.

Figure 6:
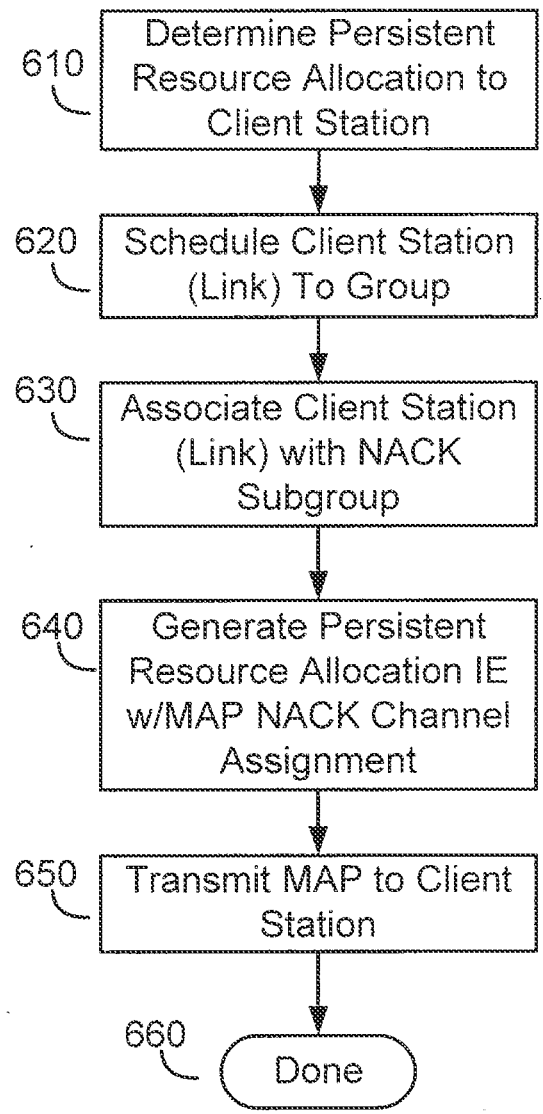
FIG. 6 is a simplified flowchart of an embodiment of a method of persistent downlink or uplink resource allocation.

FIG. 6 is a simplified flowchart of an embodiment of a method 600 of persistent downlink or uplink resource allocation. The method 600 can be implemented, for example, within a base station of FIG. 1 or FIG. 2 to enable NACK messaging used to perform error correction in persistent resource allocations. The persistent resource allocation can be an initial persistent resource allocation or can be an updated persistent resource allocation.

The method 600 begins at block 610 where the base station determines that a particular client station, or communication link established with the client station, is a candidate for persistent resource allocation. The base station proceeds to block 620 and schedules the client station for persistent resource allocation. The persistent resource allocation is valid for more than one frame. The persistent resource allocation can be specified according to a number of time division multiplexed persistence resource groups. Each group may be associated with a persistence slot index that identifies a downlink or uplink frame in each resource allocation period. The base station can assign the client station to one of the persistence groups, for example, to balance the persistent resource loading across the allocation period.

The base station proceeds to block 630 and assigns the client station to a NACK subgroup within its persistence group. Each NACK subgroup can be associated with a distinct map NACK channel assignment. The base station can utilize NACK subgroups with a plurality of client stations assigned to subgroups in order to reduce the resources needed to support NACK channels. A NACK message received by the base station on a map NACK channel associated with a particular subgroup affects all client stations associated with the group and NACK subgroup. The base station can base the retransmission on the identified client stations. The base station can operate to substantially uniformly distribute client stations across the various subgroups.

The base station proceeds to block 640 and generates for the client station a persistent resource allocation IE with a map NACK channel assignment. The base station proceeds to block 650 and transmits the persistent resource allocation IE with a map NACK channel assignment, for example, as part of a DL-MAP or UL-MAP message. The base station proceeds to block 660 and is done with the current persistent resource allocation for a client station.

Figure 7:
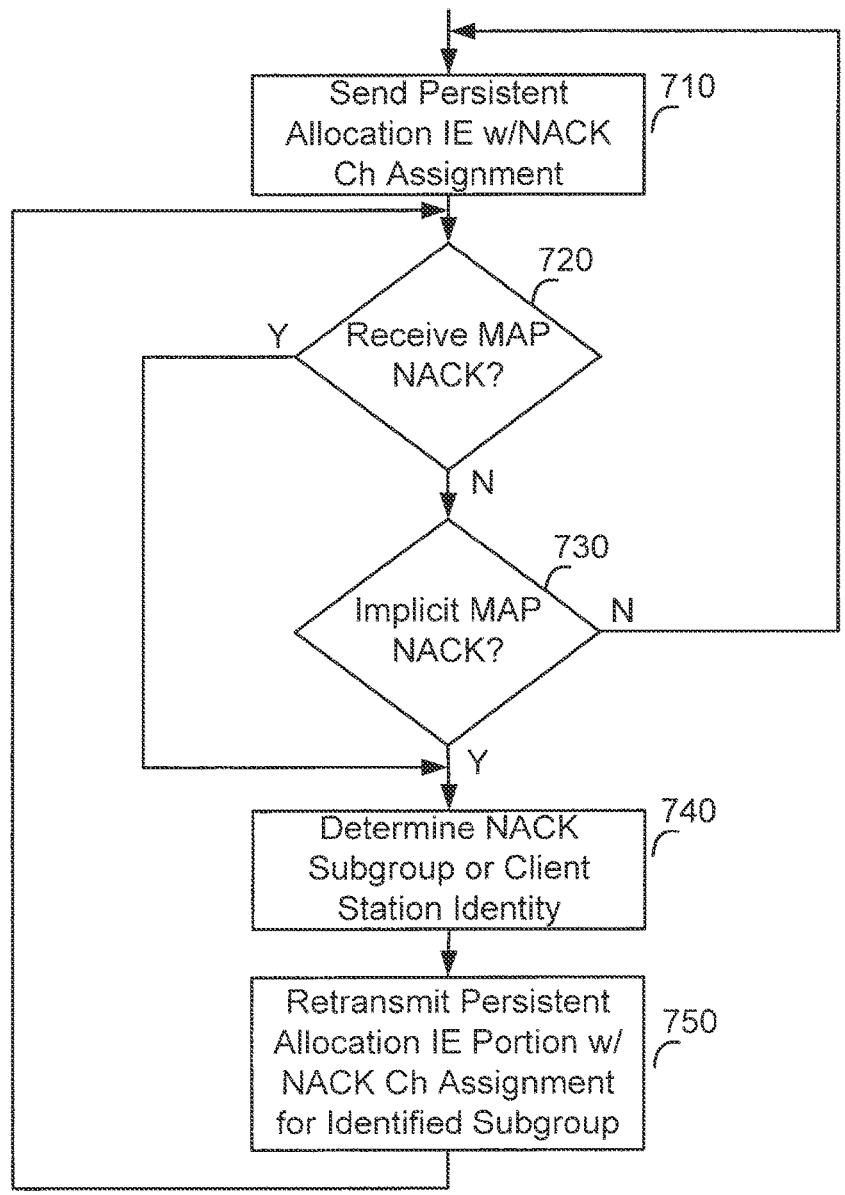
FIG. 7 is a simplified flowchart of an embodiment of a method of resource reallocation in the presence of error correction.

FIG. 7 is a simplified flowchart of an embodiment of a method 700 of resource reallocation in the presence of error correction. The method 700 of FIG. 7 can be implemented, for example, within a base station of FIG. 1 or FIG. 2.

The method 700 begins at block 710 where the base station sends a persistent allocation IE with a NACK channel assignment to one or more client stations in its serving area. The base station can, for example, generate and send the message using the method of FIG. 6.

The base station proceeds to decision block 720 and monitors the received uplink signals to determine whether a NACK message is received during an assigned NACK channel. A presence of a NACK message is an express indication of a map error condition, while absence of a NACK message does not ensure the absence of a map error condition.

If the base station determines, at decision block 720, that an express NACK message is received, the base station proceeds to block 740. Alternatively, if the base station determines, at decision block 730 that no NACK message has been received, the base station proceeds to decision block 730.

At decision block 730, the base station determine the presence of a map error condition implicitly. That is, the base station, based on one or more parameters implicitly determines the presence of a NACK. For example, the base station may monitor uplink resource allocations and may imply a NACK for any uplink resource allocation for which no transmission is received. If the base station determines that no implicit NACK is present, the base station determines an absence of a map error condition and returns to block 710. Alternatively, if the base station, at decision block 730, implicitly determines the presence of a NACK, the base station proceeds to block 740.

At block 740, the base station identifies the client station or group of client stations associated with a NACK message or indication. For example, the base station can examine the NACK channel, persistence group, and subgroup associated with a NACK message to identify one or more client stations. Alternatively, the base station can correlate a missing uplink transmission with a client station allocated the uplink resources to determine an identity of a client station.

After determining the identity of one or more client stations associated with a NACK message or indication, the base station proceeds to block 750 and determines the portion of a previously transmitted uplink resource allocation IE relevant to the identified client stations. The base station can format an updated persistent resource allocation IE repeating a portion of a previously transmitted uplink resource allocation IE relevant to the identified client stations. Alternatively, if no portion of a previously transmitted uplink resource allocation IE is relevant to the identified client stations, the base station can transmit a "no change" persistent resource allocation IE message. The base station returns to decision block 720 to determine if the latest resource allocation IE message is a source of map errors.

Figure 8:
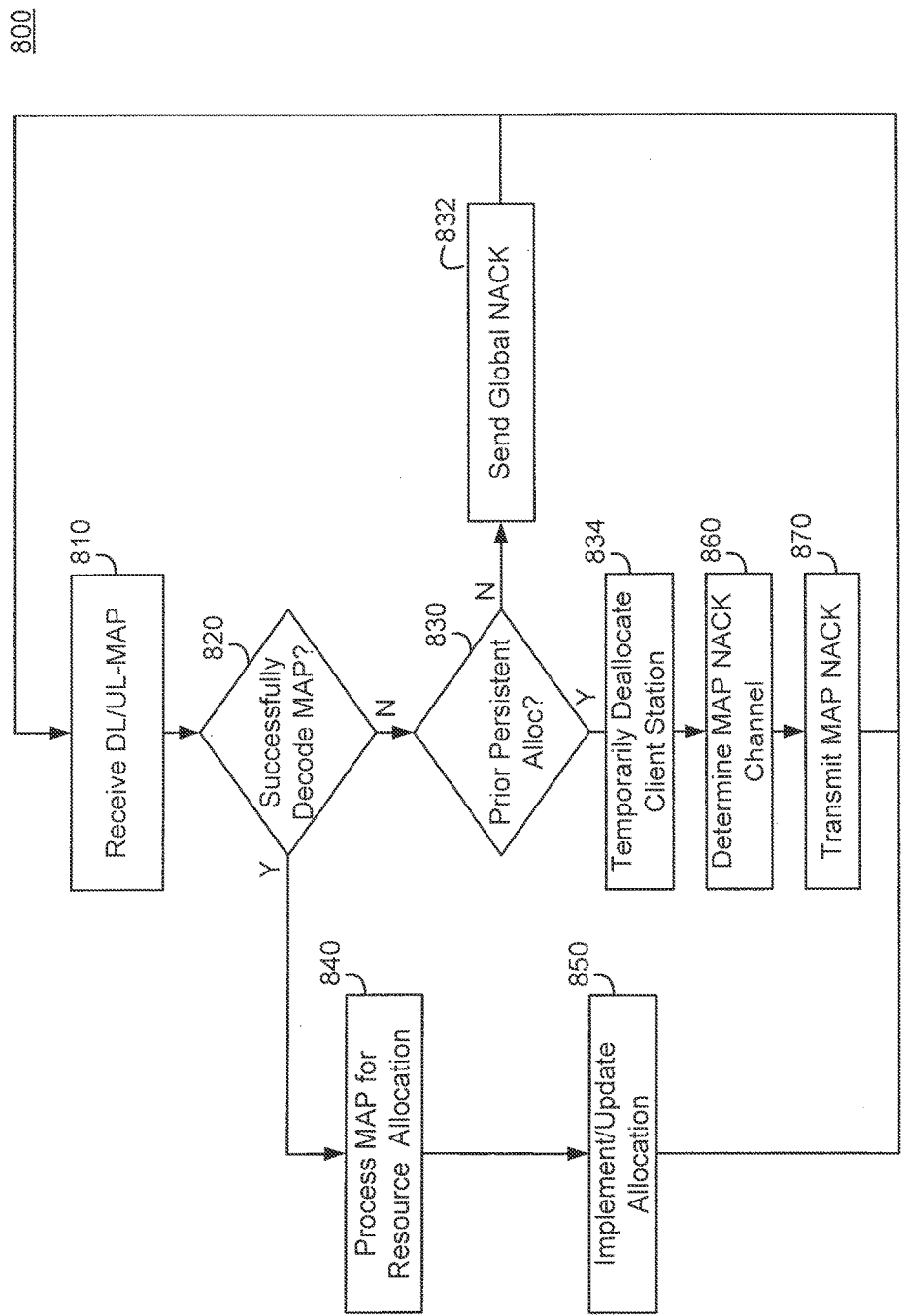
FIG. 8 is a simplified flowchart of an embodiment of a method of error correction signaling in a client station.

FIG. 8 is a simplified flowchart of an embodiment of a method 800 of error correction signaling in a client station. The method 800 can be implemented, for example, in a client station of FIG. 1 or FIG. 3.

The method 800 begins at block 810 where the client station receives a DL-MAP or an UL-MAP having a persistent resource allocation IE message. The client station proceeds to decision block 820 to determine if it is able to successfully decode the map and, in particular, the persistent resource allocation IE message. If so, the client station proceeds to block 840 to process the map for any resource allocations to the client device. The client device proceeds to block 850. Alternatively, if the client station is unable to successfully decode the map message, the client station proceeds from decision block 820 to decision block 830.

At decision block 830, the client device determines if it is already a recipient of a persistent resource allocation, such as a persistent uplink resource allocation or a persistent downlink resource allocation. If, at decision block 830, the client station determines that it has no active persistent resource allocation, the client station proceeds to block 832 in which it optionally generates ands send a global NACK to indicate the failure to potentially receive the initial resource allocation. The client station returns from block 832 to block 810 to await the next DL/UL map transmission, which likely includes a retransmission of any missed persistent resource allocation.

If, at decision block 830, the client station determines that it has previously been allocated persistent resources, the client station proceeds to block 834 to temporarily deallocate the client station from the prior persistent resource allocation to prevent potential corruption of another device's transmissions.

The client device proceeds from block 834 to block 860 and determines its associated map NACK channel assignment. The client station proceeds to block 870 and transmits the NACK on the assigned map NACK channel. The client station returns to block 810 to await the transmission of a subsequence persistent UL allocation IE.

Figure 9:
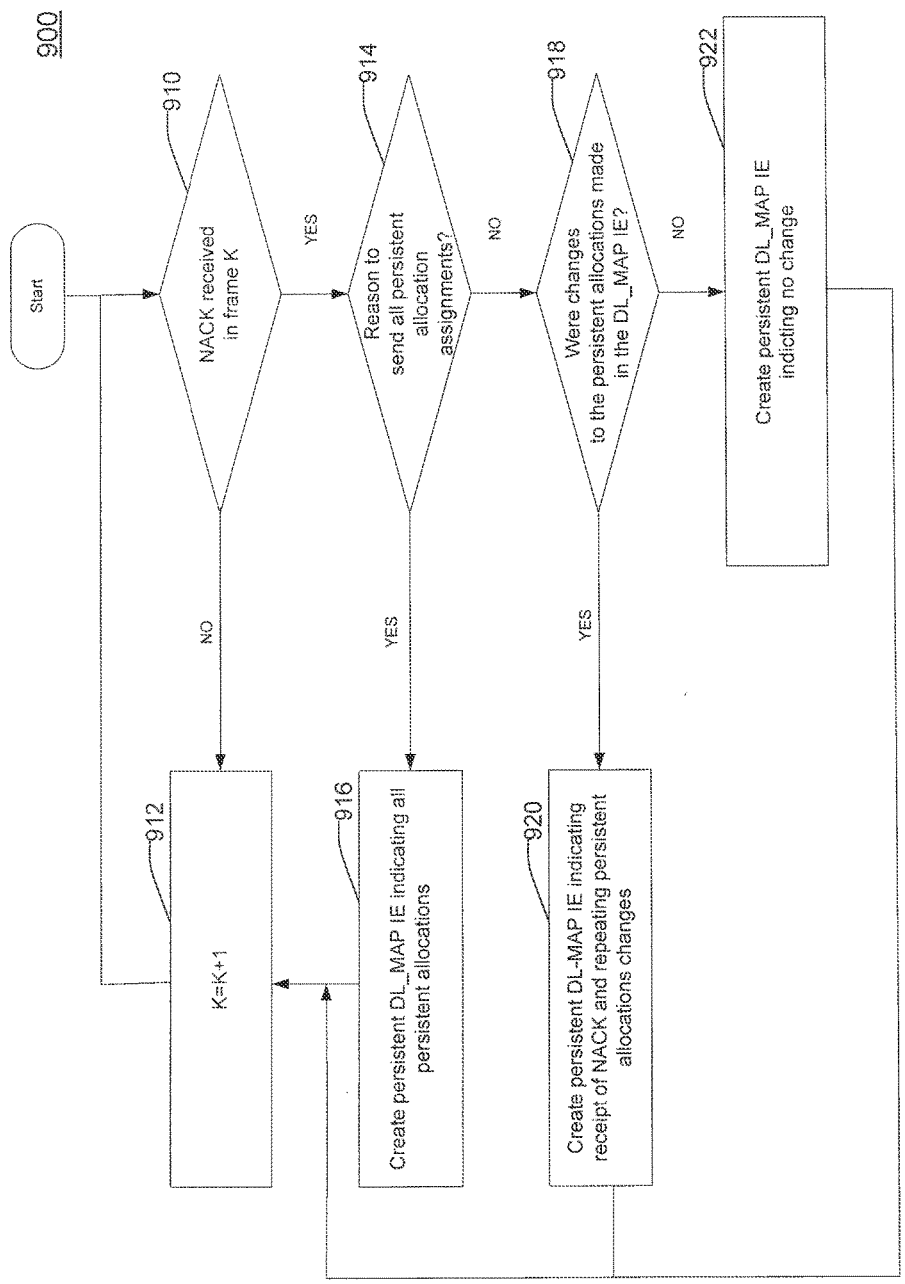
FIG. 9 is a flowchart of an embodiment of a method of addressing a persistent allocation map error from the perspective of a base station.

FIG. 9 is a more detailed flowchart of an embodiment of a method 900 of addressing a persistent allocation map error from the perspective of a base station. The method 900 can be implemented, for example, within a base stations such as the one shown in FIG. 1 or FIG. 2.

The method 900 begins in block 910 in which the base station determines whether a map NACK message was received in frame K. For example, the base station 200 may determine whether a map NACK message was received over a shared map NACK channel. In one embodiment the map NACK channel is received over the receiver 210 (FIG. 2) over a shared random access channel. In such an embodiment, the map NACK message may comprise a pseudorandom sequence the presence of which specifies a map NACK error is being indicated by a client station assigned to the shared map NACK channel. Referring again to FIG. 2, the random access channel processor 220 determines whether a map NACK message was received.

If no map NACK was received in frame K, flow continues to block 912 in which the frame counter is incremented. Flow continues back to block 910 for analysis of the next frame.

If a map NACK was received in frame K, flow continues from block 910 to block 914. In block 914, the base station determines whether it has a reason to send all persistent allocation assignments. For example, within the base station 200, the persistent DL/UL IE gyrator 250 determines whether it intends to send all currently active persistent allocation assignments.

If the base station 200 determines that it will send all currently active persistent allocation assignments, flow continues to block 916. In block 916, the base station creates a persistent DL_map IE indicating all persistent allocations. For example, the persistent DL/UL IE generator 250 creates such a message and provides the information to the DL map generator 260 for combination with other allocations. The DL map generator 260 provides the map information to the downlink processor 270 which formats the message for proper transmission over the wireless link via the transmitter 280 and an antenna 202 (such actions being omitted from FIG. 9 for clarity.)

If the base station determines that it need not send all currently active persistent allocation assignments, flow continues from block 914 to block 918. In block 918 the base station determines whether changes to the persistent allocations were made in recent downlink map IE's. For example, if the system is configured such that a client station may send one additional map NACK messages if it does not receive an expected response to a first map NACK message, the persistent DL/UL IE generator determines whether any changes to the persistent allocations were made in the two previous relevant frames. If changes were made, flow continues to block 920 in which the base station creates a DL_map IE indicating the receipt of a map NACK and repeating any persistent allocation changes that were made in the relevant frames. For example, referring again to FIG. 2, the persistent DL/UL IE generator 250 creates a message indicating receipt of a map NACK message and repeating the relevant persistent allocation changes. This information is sent over the wireless link in the manner just described.

If the base station determines that no changes were made in block 918, flow continues to block 922 to. In block 922, the base station creates a persistent downlink map IE indicating receipt of the map NACK and that no changes have been made. For example, the persistent DL UL IE generator 250 creates such a "no-changes" message and this information is sent over the wireless link in the manner just described.

Figure 10:
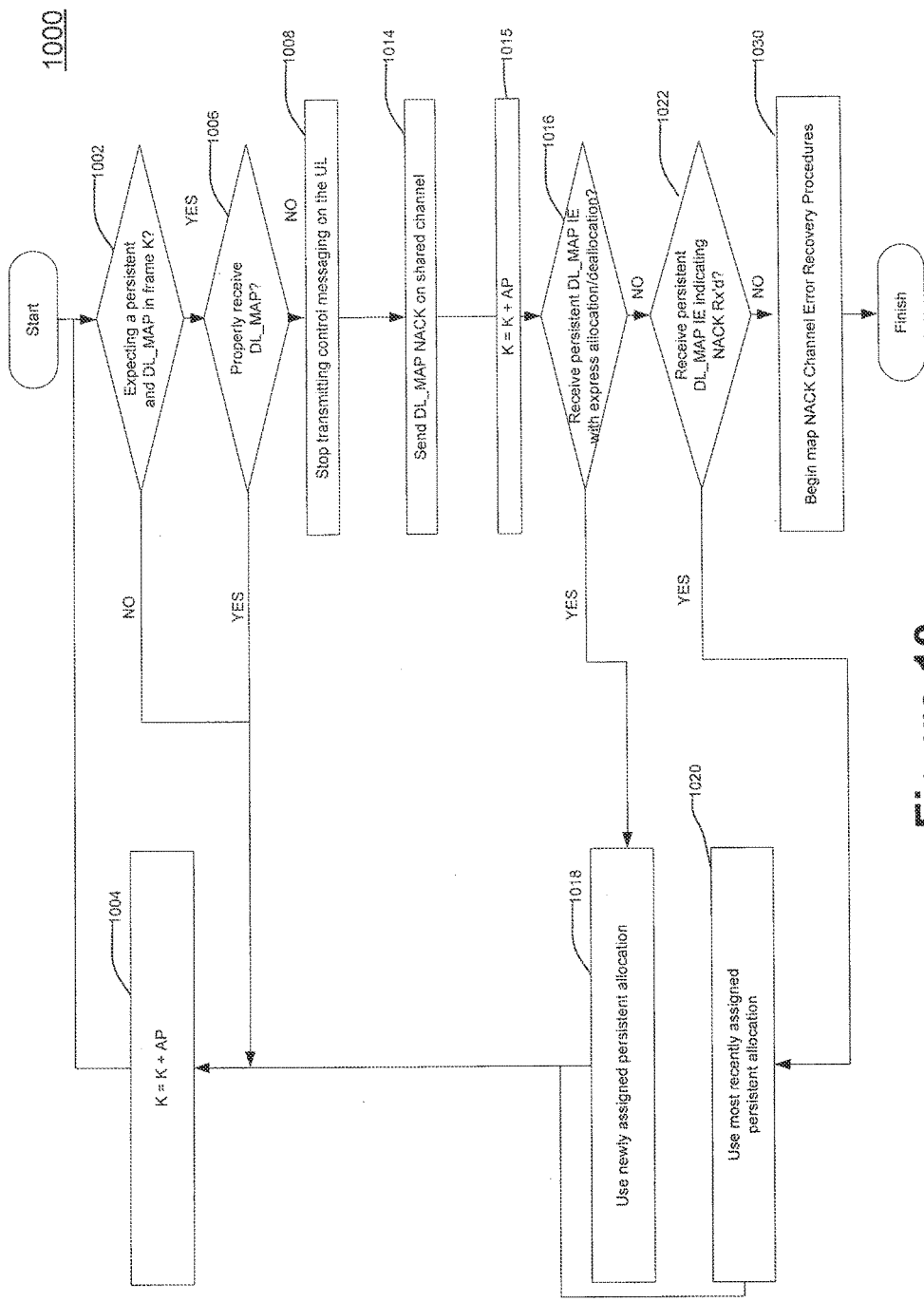
FIG. 10 is a flowchart of an embodiment of a method of addressing a downlink persistent allocation map error from the perspective of a client station.

FIG. 10 is a more detailed flowchart of an embodiment of a method 1000 of addressing a downlink persistent allocation map error from the perspective of a client station. The method 1000 can be implemented, for example, within a client station such as the one shown in FIG. 1 or FIG. 3. Although FIG. 10 is described in the context of a downlink map error, a similar process can be used to address an uplink map error.

In block 1002, the client station determines whether it is expecting a persistent DL_map in frame K. If not, flow continues to block 1004 in which the frame count is incremented. If the client station is expecting a persistent DL_map, flow continues to block 1006. In block 1006, the client station determines whether the expected downlink persistent allocation map was properly received. For example, downlink messaging from the base station is received over the downlink 116a via the antenna 302 and the receiver 310 of the client station 300, as shown in FIG. 3. The DL/UL map module 320 determines whether the downlink map was properly received. If the downlink map was properly received, flow continues to block 1004 in which the frame counter is incremented.

If the downlink map was not properly received, a map error has occurred and flow continues to block 1008. In block 1008, the client station interrupts transmissions on any uplink control messaging associated with any active downlink persistent allocation, such as an HARQ ACK channel associated with the downlink persistent allocation. In one embodiment, the client station also stops attempting to decode downlink messaging according to any active persistent allocation in order to avoid failed attempts to decode downlink allocations granted to some other client station. On the other hand, according to one aspect, the client station may continue to decode data according to any active downlink persistent allocation until the map error condition is addressed, relying on the physical (PHY) layer and media access (MAC) layer data error detection/correction mechanisms commonly in use on wireless systems to correct any data errors that may occur if its most recent downlink persistent allocation is no longer valid. In this way, if the map error was associated with a downlink persistent allocation map in which no changes were made to the client station's downlink persistent allocation, the data communication can continue without interruption.

Although it typically happens infrequently, the base station may re-map the resource associated with a shared NACK channel. For example, the base station may assign a new pseudorandom code to a shared NACK channel. Such a change is typically reported to the client station in an UL-MAP information element. If a client station fails to receive an UL-MAP information element which defined a new shared NACK channel, it may send a NACK message over an incorrect channel. Thus, according to one aspect of the invention not shown in FIG. 10, the client station determines whether the uplink map is properly received in the relevant frame following a failure to properly receive a downlink map. For example in FIG. 3, the DL/UL map module 320 determines whether the uplink map in relevant frame was properly received. If not, the client station cannot be sure that its NACK channel information is current and a map NACK channel error recovery procedure may begin without the client station sending a message on the shared NACK channel.

Flow proceeds to block 1014 in which the client station sends a downlink map NACK message in the proper frame. In one aspect, such as the one shown in FIG. 10, the delay between the occurrence of a map error and the transmission of the NACK is a predetermined value so that the base station can determine the affected persistence group based on the frame in which the map NACK is received. In FIG. 10, for purposes of example, the map NACK is sent two frames after the occurrence of the map error.

In one aspect, the client station sends a pseudorandom code over a shared DL map NACK channel in which the presence pseudorandom code indicates to the base station that one or more of a set of client stations using the shared DL map NACK channel has experienced an error. The DL/UL map module 320 passes is information to the NACK/ACK module 332 the NACK/ACK module 332 creates the shared channel pseudorandom code. The channelizer 358 receives the message which is transmitted over the uplink 116 via the synchronizer 360, the transmitter 370 and the antenna 302.

In block 1015, the frame count is incremented and the client station awaits the arrival of the next frame in which it expects to receive a persistent allocation map.

In block 1016, the client station determines whether it has received a DL_map IE in a subsequent frame including a persistent downlink allocation expressly addressed to the client station. If so, in block 1018, the client station uses the newly assigned persistent allocation. Flow continues through block 1004.

If the client station does not receive a persistent downlink map information element including a persistent downlink allocation expressly addressed thereto in block 1016, flow continues to block 1022. In block 1022, the client station determines whether it has received a persistent downlink map IE indicating that a NACK message was received but that no downlink map changes were made within the relevant frames. If so, flow continues to block 1020 and the client station resumes use of any persistent allocations which were active at the time of the map error.

In the embodiment shown in FIG. 10, if the client station does not receive a downlink map as expected, a map NACK channel error has occurred and the map NACK channel error recovery process begins in block 1030. In one aspect, the map NACK error recovery process does not commence until the client station has sent more than one map NACK, in which case, after the first pass through block 1024, the frame counter would increment and flow could continue back to block 1014.

The process for addressing a persistent map error for the uplink map is similar to the one shown in FIG. 9 for the base station and in FIG. 10 for the client station. In block 1008, it would be prudent to refrain from using any active uplink, persistent allocation to avoid the risk of transmitting on an allocation which was assigned to another client station in the missed map, possibly corrupting both transmissions.

As described above, a map NACK channel error can occur if the base station fails to receive the map NACK message. In block 1030 of FIG. 10 the client station begins a map NACK channel error recovery process due to a map NACK channel error. In one aspect, the client station sends a map NACK channel error indication on a dedicated channel, such as by using an express MAC layer message.

In another aspect, the base station uses MAC layer information to implicitly determine a map NACK channel error and the client station need not expressly address a map NACK channel error. If the channel is established using a Hybrid Automatic Repeat-reQuest (HARQ) error control method, each time the base station sends a downlink data packet to the client station it expects to receive from the client station over the uplink either an acknowledgment (ACK) indicating that the packet was successfully received or a negative acknowledgment (NACK) indicating that the packet was not successfully received, according to well known principles. If the base station fails to receive either a packet ACK or packet NACK for one or more HARQ packets, the base station can infer that a map NACK channel error has occurred. Likewise, if the base station fails to generate either a packet ACK or a packet NACK for one or more uplink HARQ packets, the base station can infer that a map NACK error has occurred. In one aspect, the base station responds to the absence of an HARQ ACK and NACK in the same manner as it was if it received a message over the NACK channel, such as in step 910 of FIG. 9. In this case, the base station knows the identity of the client station and can address the error specifically without regard to the other client stations in the persistence group.

A map NACK channel error can occur when a client station which is not currently assigned a persistent downlink or uplink allocation does not properly decode the persistent map IE which assigns to it a persistent allocation. This scenario is referred to as a lost invitation error. In this case, the client station may not been assigned a map NACK channel over which to send an indication of the map error. In one embodiment, the HARQ error detection method just described is used only the first time a persistent allocation is made in order to address a lost invitation error. After the initial persistent allocation is made and a series of packet ACKs and packets NACKs are received, the base station can assume that the client station as properly decoded the persistent map information element and has the information it needs to use the map NACK channel.

According to another aspect, the base station defines a global map NACK channel in addition to the persistent group map NACK channels discussed above. The global map NACK channel is used to address lost invitation errors. The base station advertises the global map NACK channel information in the Uplink Channel Descriptor (UCD) rather than in the persistent uplink map IE so that all client stations in the system are aware of the global map NACK channel, whether or not they are currently assigned an active persistent allocation. This global map NACK channel is used only by users without a persistent resource allocation if they fail to receive a persistent map IE. For example, if the client station had no active persistent allocation at the time the map error was detected in block 1006, the client station sends a NACK message over the global map NACK channel rather than a map NACK channel shared by a persistence group or subgroup as shown in block 1014. Alternatively or in addition, a client station which has detected a map NACK channel error can send a NACK message on the global map NACK channel as part of the recovery process. For example, in response to a lost invitation error, a client station which executed the process shown in FIG. 10 may send a global map NACK message as part of the map NACK channel error recovery process of block 1030.

When using a global map NACK channel, the base station implements a corresponding process similar to one shown in FIG. 9 with respect to the global map NACK channel. In response to receipt of a message over the global map NACK channel (similar to block 910), in a similar manner to block 914 the base station determines whether it had a reason to retransmits all persistent allocations. The base station determines: any new persistent allocations were made (similar to block 918.) If no new persistent allocations were made in the frame of interest, the base station can either send a no-changes message (similar to block 922) or simply ignore the global map NACK message. If new persistent allocations were made in the frame of interest, the base station can repeat either the entire persistent downlink and/or uplink map IE or send a partial persistent map IE including all the newly initiated persistent allocations (similar to blocks 916 and 920.) Users with persistent resource allocations typically use the map NACK channel index indicated in the persistent allocation IE rather than a global map NACK channel. The global map NACK channel can be used in conjunction with one or more error recovery techniques.

In yet another embodiment, the base station defines one or more universal map NACK channels. The universal map NACK channel is used to address lost invitation errors. For example, the base station advertises one or more universal map NACK channels in the UCD. In addition, before the first persistent allocation is made for a client station, the base station sends a group cycle index to the client station over an assured delivery service. The assured delivery service ensures that a message is received by the client station. For example such a link requires an acknowledgment from the client station before the message is considered to have been successfully transmitted. In an 802.16 system, the base station may use a delivery assured dynamic service (DSx) message to send the group cycle index to the client station. Client station may use the universal map NACK channels only after it has been allocated a map NACK index. In this way, client stations which are neither using nor a candidate to use a persistent allocation do not send messages over the universal map NACK channel thus reducing overhead. Once the base station receives a message on the universal map NACK channel, if no new persistent allocations were made in the frame of interest, the base station can either send a "no changes" message or simply ignore the universal map NACK message. If new persistent allocations were made in the frame of interest, the base station can repeat either the entire persistent uplink map IE or just send a partial persistent downlink or uplink map IE. In one embodiment, the universal map NACK channel is used in addition to the map NACK channel specified in the persistent downlink or uplink map IE as discussed above.

In yet another embodiment, lost invitation errors are addressed using a temporary map ACK channel. Whenever a new persistent allocation is made, the persistent map IE includes a map ACK channel for use by the client station only to acknowledge this first allocation. If the base station fails to receive a message on the map ACK channel, the base station acts in the same manner as if it received a message over the map NACK channel. Once the client station has successfully received the persistent map IE, it indicates subsequent map errors in loss using the map NACK channel assigned using the persistent allocation IE.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. When implemented in software, firmware, middleware or microcode, the program code or code segments to perform the necessary tasks may be stored in a machine readable medium such as a storage medium. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of persistent resource allocation performed by a base station, the method comprising:
   transmitting, via a wireless radio frequency (RF) transmitter of the base station, a first RF wireless signal including persistent resource allocation information, the persistent resource allocation information including an indication of downlink (DL) persistent resources, a first identifier associated with a client station, an indication of a DL allocation period, an indication of uplink (UL) persistent resources, and an indication of an UL allocation period;
   periodically transmitting a second series of RF wireless signals including DL user data, via the wireless RF transmitter of the base station to the client station associated with the first identifier, the second series of RF wireless signals being transmitted via the DL persistent resources and based on the DL allocation period, the DL persistent resources repeating at an interval defined by the DL allocation period; and
   persistently receiving a third series of RF wireless signals including UL user data, via a wireless RF receiver of the base station, the third series of RF wireless signals being received via the UL persistent resources and based on the UL allocation period from the client station associated with the first identifier, the UL persistent resources repeating at an interval defined by the UL allocation period.

2. The method of claim 1, further comprising:
   transmitting non-persistent resource allocation information including an indication of non-persistent resources and a second identifier associated with the client station; and
   transmitting second DL user data to the client station associated with the second identifier using the non-persistent resources.

3. The method of claim 1, further comprising:
   subsequent to transmitting the persistent resource allocation information, transmitting an indication of a release of the persistent resources; and
   receiving an indication of a positive acknowledgement (ACK) of the release.

4. The method of claim 1, wherein the DL allocation period is different than the UL allocation period.

5. The method of claim 1, further comprising:
   transmitting an offset indication, wherein the offset indication indicates an offset in a region of the UL persistent resources; and
   the persistently receiving further including receiving the UL user data via resources based on the offset.

6. The method of claim 1, wherein a number of empty transmissions indicates an implicit release of the UL persistent resources.

7. The method of claim 1, wherein the persistent resource allocation information is transmitted via a control channel.

8. The method of claim 7, wherein the DL user data is transmitted via a shared channel.

9. The method of claim 1, wherein at least one of the UL persistent resources and the DL persistent resources are used in voice over Internet protocol (VoIP) communication.

10. The method of claim 1, wherein the persistent resource allocation information further includes an indication of UL resources for hybrid automatic repeat request (HARQ) information.

11. The method of claim 1, wherein the transmitting the persistent resource allocation information includes transmitting a plurality of persistent resource allocation messages.

12. A base station operable to allocate persistent resources, the base station comprising:
   a wireless radio frequency (RF) transmitter configured to:
      transmit a first RF wireless signal including persistent resource allocation information, the persistent resource allocation information including an indication of downlink (DL) persistent resources, a first identifier associated with a client station, an indication of DL allocation period, an indication of uplink (UL) persistent resources, and an indication of an UL allocation period; and
      periodically transmit a second series of RF wireless signals including DL user data, to the client station associated with the first identifier, the second series of RF wireless signals being transmitted via the DL persistent resources and based on the DL allocation period, the DL persistent resources repeating at an interval defined by the DL allocation period; and
   a wireless RF receiver configured to persistently receive a third series of RF wireless signals including UL user data, the third series of RF wireless signals being received via the UL persistent resources and based on the UL allocation period from the client station associated with the first identifier, the UL persistent resources repeating at an interval defined by the UL allocation period.

13. The base station of claim 12, wherein the wireless RF transmitter is further configured to:
transmit non-persistent resource allocation information including an indication of non-persistent resources and a second identifier associated with the client station; and
transmit second DL user data to the client station associated with the second identifier using the non-persistent resources.

14. The base station of claim 12, wherein:
the wireless RF transmitter is further configured to, subsequent to transmitting the persistent resource allocation information, transmit an indication of a release of the persistent resources; and
the wireless RF receiver is further configured to receive an indication of a positive acknowledgement (ACK) of the release.

15. The base station of claim 12, wherein the DL allocation period is different than the UL allocation period.

16. The base station of claim 12, wherein:
the wireless RF transmitter is further configured to transmit an offset indication, wherein the offset indication indicates an offset in a region of the UL persistent resources; and
the wireless RF receiver is further configured to receive the UL user data via resources that are based on the offset.

17. The base station of claim 12, wherein a number of empty transmissions indicates an implicit release of the UL persistent resources.

18. The base station of claim 12, wherein the persistent resource allocation information is transmitted via a control channel.

19. The base station of claim 18, wherein the DL user data is transmitted via a shared channel.

20. The base station of claim 12, wherein at least one of the UL persistent resources and the DL persistent resources are used in voice over Internet protocol (VoIP) communication.

21. The base station of claim 12, wherein the persistent resource allocation information further includes an indication of UL resources for hybrid automatic repeat request (HARQ) information.

22. The base station of claim 12, wherein the persistent resource allocation information includes a plurality of persistent resource allocation messages.

23. The method of claim 1, wherein the first identifier is selected from a predetermined range of values.

24. The base station of claim 12, wherein the first identifier is selected from a predetermined range of values.

* * * * *